US012782564B2

(12) United States Patent
Kim et al.

(10) Patent No.: US 12,782,564 B2
(45) Date of Patent: Nov. 3, 2026

(54) IMAGE SENSOR, CAMERA MODULE INCLUDING THE IMAGE SENSOR, AND OPERATING METHOD OF THE IMAGE SENSOR

(71) Applicant: SAMSUNG ELECTRONICS CO., LTD., Suwon-si (KR)

(72) Inventors: Daeyun Kim, Suwon-si (KR); Myoungoh Ki, Suwon-si (KR); Jonghan Ahn, Suwon-si (KR)

(73) Assignee: SAMSUNG ELECTRONICS CO., LTD., Suwon-wi (KR)

( * ) Notice: Subject to any disclaimer, the term of this patent is extended or adjusted under 35 U.S.C. 154(b) by 398 days.

(21) Appl. No.: 18/612,741

(22) Filed: Mar. 21, 2024

(65) Prior Publication Data

US 2024/0319366 A1 Sep. 26, 2024

(30) Foreign Application Priority Data

Mar. 24, 2023 (KR) ........................ 10-2023-0039267
May 12, 2023 (KR) ........................ 10-2023-0061736

(51) Int. Cl.

| | |
|---|---|
| ***G01S 17/26*** | (2020.01) |
| ***G01S 7/4863*** | (2020.01) |
| ***G01S 7/4865*** | (2020.01) |
| ***G01S 17/894*** | (2020.01) |
| ***G06F 1/06*** | (2006.01) |

(52) U.S. Cl.

CPC ............ *G01S 17/26* (2020.01); *G01S 7/4863* (2013.01); *G01S 7/4865* (2013.01); *G01S 17/894* (2020.01); *G06F 1/06* (2013.01)

(58) Field of Classification Search

CPC ...... G01S 17/26; G01S 7/4863; G01S 7/4865; G01S 17/894; G01S 7/4915; G01S 17/36; G06F 1/06

USPC .............................................................. 356/4

See application file for complete search history.

(56) References Cited

U.S. PATENT DOCUMENTS

| | | | | |
|---|---|---|---|---|
| 11,340,351 | B2 | 5/2022 | Nagai | |
| 11,493,614 | B2 | 11/2022 | Gong et al. | |
| 2013/0258099 | A1 * | 10/2013 | Ovsiannikov | G01S 17/894 348/140 |

(Continued)

FOREIGN PATENT DOCUMENTS

| | | | |
|---|---|---|---|
| WO | 2022/209180 | A1 | 10/2022 |

*Primary Examiner* — Susan E. Hodges
(74) *Attorney, Agent, or Firm* — Sughrue Mion, PLLC

(57) ABSTRACT

An image sensor for measuring a depth of an object disposed in an unambiguous range is provided. The image sensor includes: a modulation clock generating circuit configured to generate N modulation clock signals respectively having N phases; a demodulation clock generating circuit configured to generate N demodulation clock signals respectively having N phases respectively corresponding to the N modulation clock signals; a phase selection circuit configured to select one modulation clock signal from among the N modulation clock signals to output as a pre-modulation signal, based on a random number, and select, from among the N demodulation clock signals, and output as N pre-demodulation signals corresponding to the pre-modulation signal, based on the random number; and a time gating circuit configured to control a time at which the pre-modulation signal and the N pre-demodulation signals are applied, based on the unambiguous range.

20 Claims, 24 Drawing Sheets

(56) References Cited

U.S. PATENT DOCUMENTS

| | | | |
|---|---|---|---|
| 2021/0166407 | A1 | 6/2021 | Chen et al. |
| 2021/0286083 | A1 | 9/2021 | Yasu et al. |
| 2021/0325535 | A1 | 10/2021 | Yasu et al. |
| 2021/0325540 | A1 * | 10/2021 | Spickermann ........ G01S 7/4816 |
| 2022/0075070 | A1 | 3/2022 | Kawahito |
| 2022/0113410 | A1 | 4/2022 | Sugiyama |
| 2022/0244046 | A1 | 8/2022 | Yokogawa et al. |
| 2023/0077551 | A1 | 3/2023 | Kim et al. |

* cited by examiner

IMAGE SENSOR, CAMERA MODULE INCLUDING THE IMAGE SENSOR, AND OPERATING METHOD OF THE IMAGE SENSOR

CROSS-REFERENCE TO RELATED APPLICATIONS

This application claims priority to Korean Patent Application Nos. 10-2023-0039267, filed on Mar. 24, 2023, and 10-2023-0061736, filed on May 12, 2023, in the Korean Intellectual Property Office, the disclosures of which are incorporated by reference herein in their entireties.

BACKGROUND

The present disclosure relates to an image sensor, a camera module including the image sensor, and an operating method of the image sensor, and more particularly, to an image sensor for removing a wrapping signal, a camera module including the image sensor, and an operating method of the image sensor.

Time-of-flight (ToF)-based image sensors may measure information about a distance to an object and may thus generate a three-dimensional (3D) image of the object. ToF-based image sensors may irradiate light onto an object, and then, may measure a ToF, which corresponds to a time for light reflected from the object to be received after the light is irradiated to the object, to obtain information about a distance to the object. The information about the distance includes noise occurring due to various causes, and thus, there is a need to develop a method for minimizing noise so as to obtain accurate information.

SUMMARY

One or more example embodiments provide an image sensor which may remove a wrapping signal to measure an accurate depth of an object.

According to an aspect of an example embodiment, there is provided an image sensor.

The image sensor includes: a modulation clock generating circuit configured to generate first to Nth modulation clock signals respectively having N phases; a demodulation clock generating circuit configured to generate first to Nth demodulation clock signals respectively having N phases respectively corresponding to the first to Nth modulation clock signals; a phase selection circuit configured to select one modulation clock signal from among the first to Nth modulation clock signals to output as a pre-modulation signal, based on a random number, and select, from among the first to Nth demodulation clock signals, and output as first to Nth pre-demodulation signals corresponding to the pre-modulation signal, based on the random number; and a time gating circuit configured to control a time at which the pre-modulation signal and the first to Nth pre-demodulation signals are applied, based on the unambiguous range. N is a natural number of 2 or more.

According to another aspect of an example embodiment, there is provided an operating method of an image sensor which transmits a light signal, transferred by using a light source driven by a modulation signal, to an object and performs an arithmetic operation on a signal reflected from the object to measure a depth of the object.

The operating method includes: determining whether the signal is delayed by a period or more of the modulation signal; and based on the signal being delayed by the period or more of the modulation signal, performing control so that a pre-modulation signal and a plurality of pre-demodulation signals corresponding to the pre-modulation signal, which respectively have different phases, are applied based on a random number in each packet to which the signal that is delayed by the period or more is applied.

According to another aspect of an example embodiment, there is provided a camera.

The camera includes: a light source configured to emit a transmission light signal to an object; and an image sensor configured to receive a reception light signal reflected from the object to measure a depth of the object disposed in an unambiguous range. The image sensor includes: a modulation clock generating circuit configured to generate first to Nth modulation clock signals respectively having N phases; a demodulation clock generating circuit configured to generate first to Nth demodulation clock signals respectively having N phases respectively corresponding to the first to Nth modulation clock signals; a phase selection circuit configured to select one modulation clock signal from among the first to Nth modulation clock signals to output as a pre-modulation signal, based on a random number, and select, from among the first to Nth demodulation clock signals, and output first to Nth pre-demodulation signals corresponding to the pre-modulation signal, based on the random number; and a time gating circuit configured to control a time at which the pre-modulation signal and the first to Nth pre-demodulation signals are applied, based on the unambiguous range. N is a natural number of 2 or more.

BRIEF DESCRIPTION OF DRAWINGS

The above and other aspects will be more apparent from the following description of example embodiments taken in conjunction with the accompanying drawings, in which.

DETAILED DESCRIPTION

Hereinafter, example embodiments will be described in detail with reference to the accompanying drawings. Example embodiments described herein are example embodiments, and thus, the present disclosure is not limited thereto, and may be realized in various other forms. Each example embodiment provided in the following description is not excluded from being associated with one or more features of another example or another embodiment also provided herein or not provided herein but consistent with the present disclosure. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c. It will be also understood that, even if a certain step or operation of manufacturing an apparatus or structure is described later than another step or operation, the step or operation may be performed later than the other step or operation unless the other step or operation is described as being performed after the step or operation.

Figure 1:
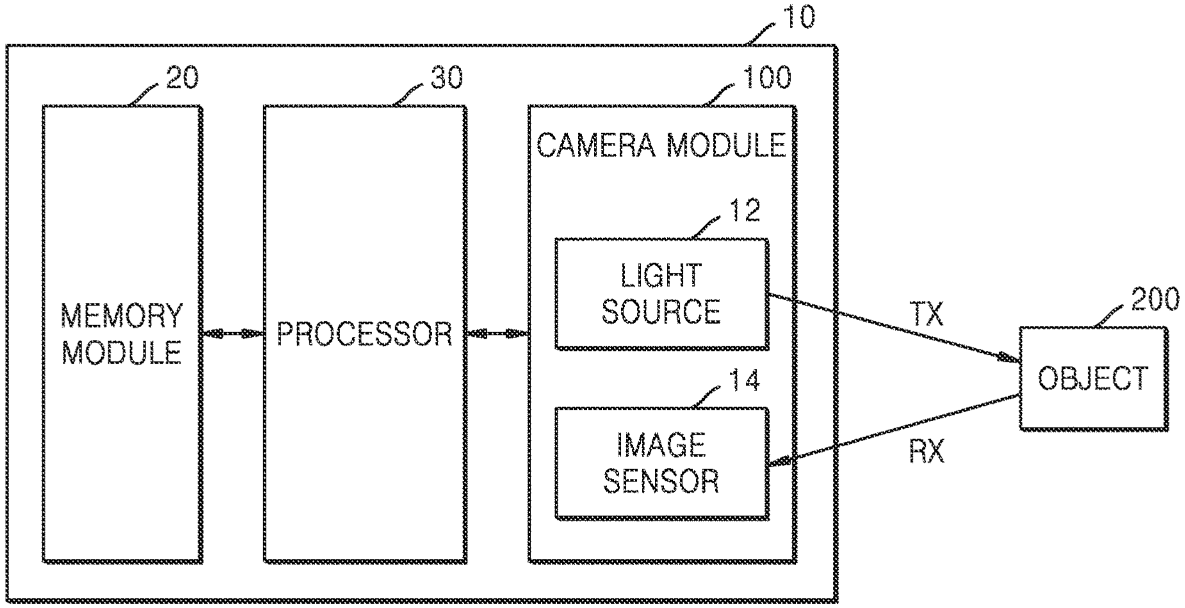
FIG. 1 is a schematic block diagram of a system according to an example embodiment.

FIG. 1 is a schematic block diagram of a system 10 according to an example embodiment.

Referring to FIG. 1, the system 10 may include a processor 30 and a camera module (i.e., camera) 100. The system 10 may further include a memory module (i.e., memory) 20, which is connected with the processor 30 and stores information such as image data received from the camera module 100. In an example embodiment, the system 10 may be integrated into one semiconductor chip, and each of the camera module 100, the processor 30, and the memory module 20 may be implemented as a separate semiconductor chip. The memory module 20 may include one or more memory chips. In an example embodiment, the processor 30 may include multi-processing chips.

The system 10 may be an electronic device for application of an image sensor for distance measurement, according to an example embodiment. The system 10 may be portable or stationary. Examples of a portable type of the system 10 may include mobile devices, cellular phones, smartphones, user equipment (UE), tablet personal computers (PCs), digital cameras, laptop or desktop computers, electronic smart watches, machine-to-machine (M2M) communication devices, virtual reality (VR) devices or modules, and robots. Examples of a stationary type of the system 10 may include game consoles of video arcades, interactive video terminals, vehicles, machine field systems, machine vision systems, industrial robots, VR devices, and driver-mounted cameras of vehicles.

The system 10 according to an example embodiment may not be affected by a stack structure used in sensors and may be applied to sensors having any stack structure. According to an example embodiment, the system 10 according to an example embodiment may be applied to a sensor having one structure among a single chip, a 2-stack sensor, a 2-layer pixel sensor, and a 3-stack sensor. According to an example embodiment, in the 2-layer pixel sensor, only a photodiode may be disposed in a chip of an upper substrate in a pixel and a silicon on insulator (SOI) substrate may be bonded to the chip of the upper substrate, and then, by forming a driving transistor (for example, a transfer transistor, a reset transistor, a selection transistor, and an amplification transistor), the pixel may be configured as a 2-layer pixel.

The camera module 100 may include a light source 12 and an image sensor 14. The light source 12 may emit a transmission light signal TX to an object 200. The transmission light signal TX output from the light source 12 may be reflected by the object 200, and the image sensor 14 may receive a reception light signal RX reflected from the object 200. The image sensor 14 may obtain depth information, which is range information about the object 200, based on a time-of-flight (ToF).

The light source 12 may include a light emitting element and a light source driver, which drives the light source. The image sensor 14 may include a pixel array, a control circuit which drives the pixel array, and a readout circuit which reads out a pixel signal output from the pixel array. In the image sensor 14 according to an example embodiment, only desired range information may be obtained, and accurate depth information may be obtained by noise-processing depth information deviating from an unambiguous measurement range. In an example embodiment, an unambiguous measurement range and an unambiguous range may be described in common. Unambiguous measurement range may refer the same meaning as Effective measuring distance. The unambiguous measurement range may refer the range of distance that a camera module 100 can effectively measure.

The processor 30 may be a central processing unit (CPU), which is a general-use processor. In an example embodiment, the processor 30 may further include a microcontroller, a digital signal processor (DSP), a graphics processing unit (GPU), and an application specific integrated circuit (ASIC) processor, in addition to a CPU. Also, the processor 30 may include one or more CPUs, which operate in a distributed processing environment. In an example embodiment, the processor 30 may be a system on chip (SoC), which has additional functions in addition to a function of a CPU.

The processor 30 may control operations of the light source 12 and the image sensor 14. In an example embodiment, the system 10 may include a mode switch which is controlled by a user to switch between a two-dimensional (2D) imaging mode and a three-dimensional (3D) imaging mode. When the user selects the 2D imaging mode by using the mode switch, the processor 30 may activate the image sensor 14 and the 2D imaging mode may use peripheral light, and thus, the light source 12 may not be activated.

When the user selects the 3D imaging mode by using the mode switch, the processor 30 may activate all of the light source 12 and the image sensor 14. Processed image data received from a readout circuit may be stored in the memory module 20 by the processor 30. The processor 30 may display a 2D or 3D image, selected by the user, on a display screen of the system 10. The processor 30 may be programmed as software or firmware for performing various processing operations, including those described herein. In an example embodiment, the processor 30 may include programmable hardware logic circuits for performing some or all of functions described above. For example, the memory module 20 may store program code, a lookup table, or intermediate operation results to enable the processor 30 to perform a corresponding function.

The memory module 20 may be, for example, a dynamic random access memory (DRAM) module such as synchronous DRAM, a high bandwidth memory (HBM) module, or a DRAM-based 3D stack memory module such as a hybrid memory cube (HMC) memory module. The memory module 20 may be, for example, a solid state drive (SSD), a DRAM module, or a semiconductor-based storage such as static random access memory (RAM), phase-change RAM, resistive RAM (RRAM), conductive-bridge RAM (CBRAM), magnetic RAM (MRAM), and spin-transfer torque MRAM (STT-MRAM).

Figure 2:
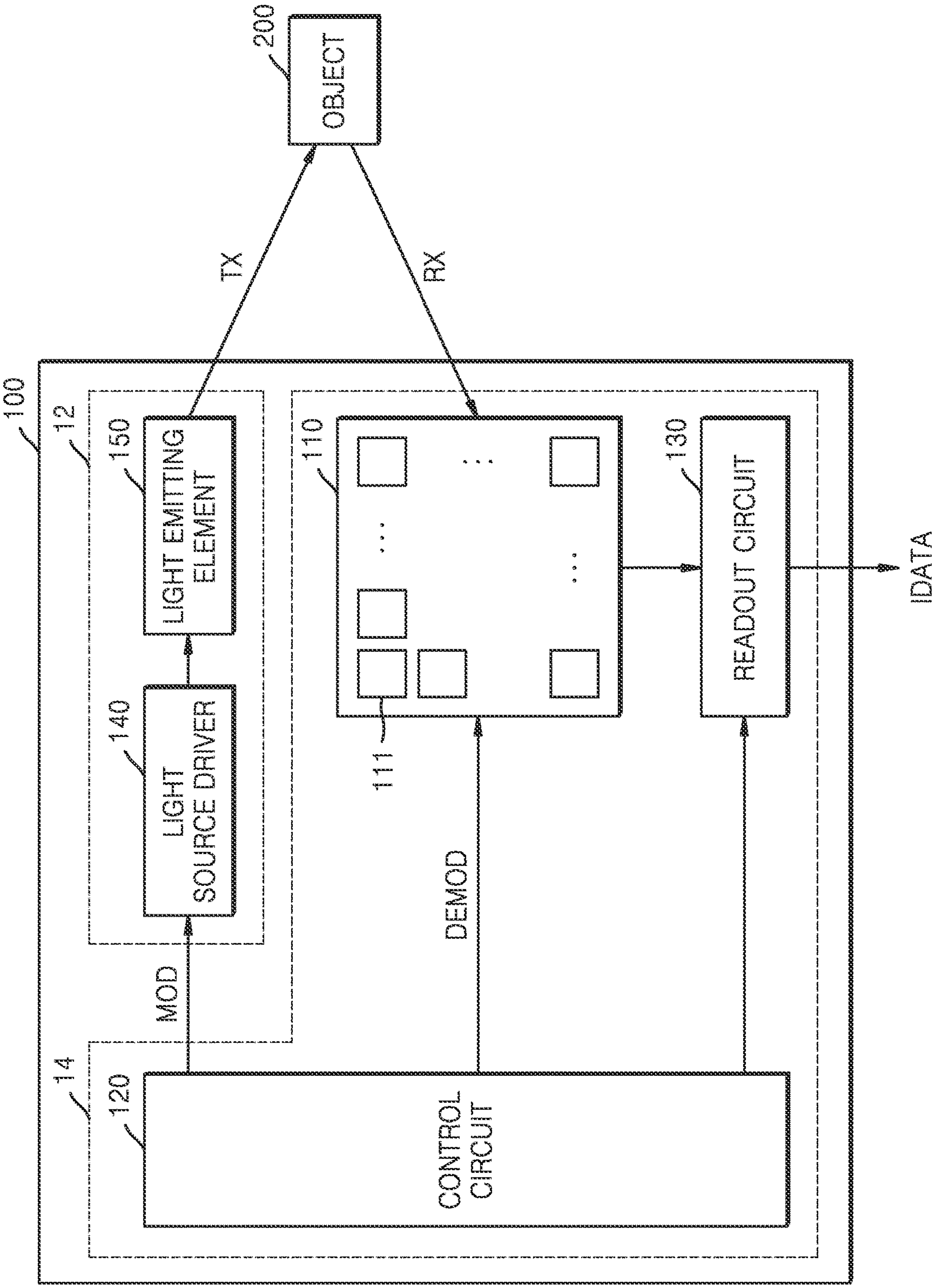
FIG. 2 is a block diagram for describing a camera module according to an example embodiment.

FIG. 2 is a block diagram for describing a camera module 100 according to an example embodiment.

Referring to FIGS. 1 and 2, the camera module 100 may be used to obtain range information about the object 200. The range information may be calculated by the processor 30 based on image data IDATA output from the image sensor 14, or may be autonomously calculated in the image sensor 14. In an example embodiment, the range information may be used as a portion of a 3D user interface by the processor 30 and may thus enable the user of the system 10 to interact with a 3D image of the object 200 or use the 3D image of the object 200 as a portion of another application executed in the system 10 or a game.

The light source 12 may include a light source driver 140 and a light emitting element 150. The light source 12 may further include a lens.

The light emitting element 150 may transmit a transmission light signal TX to the object 200. The light emitting element 150 may include a laser diode (LD) or a light-emitting diode (LED), a monochromatic illumination source implemented by combining a near infrared laser, a point light source, a white light lamp, and a monochromator, or a combination of other laser beam sources. For example, the light emitting element 150 may be a vertical-cavity surface-emitting layer (VCSEL). In an example embodiment, the light emitting element 150 may output an infrared transmission light signal TX having a wavelength within a range of about 800 nm to about 1,000 nm.

The light source driver 140 may generate a driving signal for driving the light emitting element 150. The light source driver 140 may drive the light emitting element 150 in response to a modulation signal MOD received from the control circuit 120.

The image sensor 14 may measure a range or a depth by using the ToF principle. The image sensor 14 may receive a reception light signal RX reflected from the object 200. The image sensor 14 may include a pixel array 110, a control circuit 120, and a readout circuit 130. The image sensor 14 may further include a lens, and the reception light signal RX may be supplied to the pixel array 110 through the lens.

The pixel array 110 may include a plurality of unit pixels 111. The plurality of unit pixels 111 may operate based on a ToF scheme. The ToF scheme may be a method of calculating a depth based on a phase difference between a demodulation signal and a reflected wave of a modulation light source. According to an example embodiment, the pixel array 110 using the ToF scheme may store an electron, generated from a received signal by using a demodulation signal having four phases, in a tap of each phase. A structure of each of the plurality of unit pixels 111 is described below with reference to FIG. 3.

The pixel array 110 may be an RGB pixel array where different pixels integrate pieces of light having different colors. The pixel array 110 may include, for example, a 2D sensor such as a 2D RGB sensor, a 2D infrared (IR) sensor, a 2D near IR (NIR) sensor, a 2D RGBW sensor, and a 2D RGB-IR sensor each including an infrared (IR) cutoff filter. The system 10 may use the same pixel array 110 for imaging of 2D RGB colors of the object 200 (or a scene including an object) as well as for measuring a range up to the object 200.

The pixel array 110 may convert the received reception light signal RX into corresponding electrical signals (i.e., pixel signals). The readout circuit 130 may generate the image data IDATA based on pixel signals output from the pixel array 110. For example, the readout circuit 130 may perform analog-to-digital conversion on the pixel signals.

The image sensor 14 may further include a memory, or may further include an image signal processor. The image data IDATA may be stored in the memory, and the image signal processor may process the image data IDATA to calculate the range information or the depth information. The memory or the image signal processor may be provided outside the image sensor 14.

The control circuit 120 may control the elements (for example, the pixel array 110 and the readout circuit 130) of the image sensor 14 and may control the light source driver 140 of the light source 12. The control circuit 120 may transfer the modulation signal MOD to the light source driver 140 and may transfer demodulation signals DEMOD, corresponding to the modulation signal MOD, to the pixel array 110. The demodulation signals DEMOD may denote signals for respectively controlling transfer transistors respectively included in the unit pixels 111 but are not limited thereto.

In a case where the control circuit 120 outputs modulation signals MOD and the demodulation signals DEMOD, when a received signal is a signal deviating from an unambiguous range, the control circuit 120 may perform control to output the modulation signals MOD and the demodulation signals DEMOD corresponding thereto randomly for each packet for an integration time corresponding to one frame. Therefore, the control circuit 120 may noise-process signals in the unambiguous range or more and may thus obtain only depth information about an object located in a desired unambiguous range. Accordingly, depth information about a desired range may be obtained. Detailed elements of the control circuit 120 are described below with reference to FIG. 4.

Figure 3:
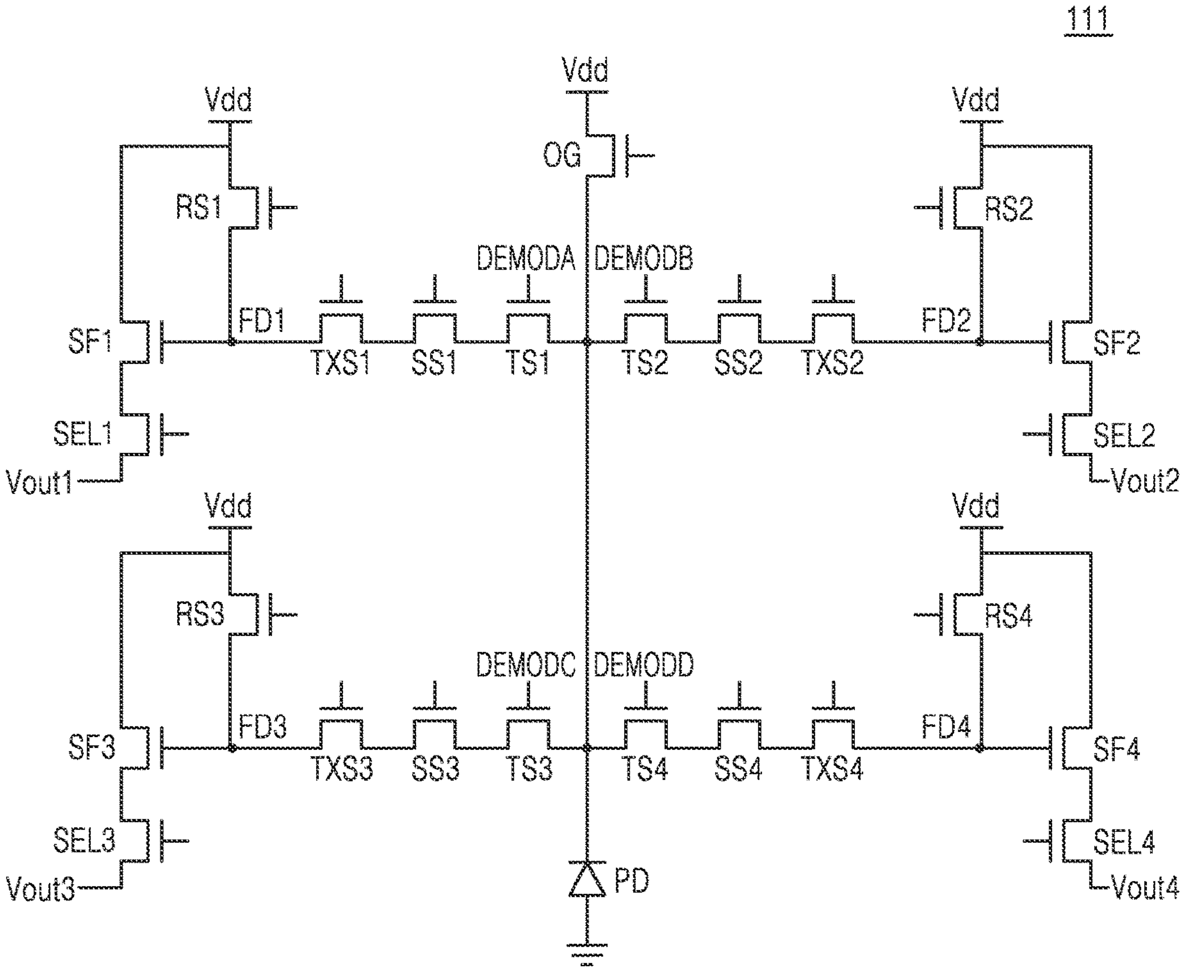
FIG. 3 is a diagram for describing an example embodiment of a structure of a unit pixel illustrated in FIG. 2.

FIG. 3 is a diagram for describing an example embodiment of a structure of the unit pixel 111 illustrated in FIG. 2.

As shown in FIG. 3, the unit pixel 111 may have a 4-tap structure. The 4-tap structure may denote a structure where one unit pixel 111 includes four taps, and a tap may denote a unit component which may differentiate and transfer, by phases, photocharges generated and accumulated in the unit pixel 111 as an external light signal is irradiated thereon.

An image sensor (for example, 14 of FIG. 2) including unit pixels 111 having the 4-tap structure may implement a method of performing transmission on 0-degree, 90-degree, 180-degree, and 270-degree phases by using four taps. For example, with respect to a first tap of the unit pixel 111, in a case where the first tap of the unit pixel 111 generates a first pixel signal Vout1 corresponding to a 0-degree phase, a second tap may generate a second pixel signal Vout2 corresponding to a 90-degree phase, a third tap may generate a third pixel signal Vout3 corresponding to a 180-degree phase, and a fourth tap may generate a fourth pixel signal Vout4 corresponding to a 270-degree phase.

Referring to FIG. 3, the unit pixel 111 may include a photodiode PD, an overflow gate OG, first to fourth transfer transistors TS1 to TS4, first to fourth storage transistors SS1 to SS4, first to fourth tap transfer transistors TXS1 to TXS4, first to fourth reset transistors RS1 to RS4, first to fourth source followers SF1 to SF4, and first to fourth selection transistors SEL1 to SEL4. According to an example embodiment, one of the overflow gate OG, the first to fourth storage transistors SS1 to SS4, the first to fourth tap transfer transistors TXS1 to TXS4, the first to fourth reset transistors RS1 to RS4, the first to fourth source followers SF1 to SF4, and the first to fourth selection transistors SEL1 to SEL4 may be omitted.

The photodiode PD may generate a photocharge, which varies based on an intensity of a reception light signal (for example, RX of FIG. 2). That is, the photodiode PD may convert the reception light signal RX into an electrical signal. The photodiode PD may be a photoelectric conversion device and may be, for example, one of a photo transistor, a photo gate, a pinned photodiode (PPD), and a combination thereof.

The first to fourth transfer transistors TS1 to TS4 may respectively transfer a photocharge, generated in the photodiode PD, to the first to fourth storage transistors SS1 to SS4 according to first to fourth demodulation signals DEMODA to DEMODD. Therefore, the first to fourth transfer transistors TS1 to TS4 may respectively transfer the photocharge, generated in the photodiode PD, to first to fourth floating diffusion nodes FD1 to FD4 according to the first to fourth demodulation signals DEMODA to DEMODD.

The first to fourth demodulation signals DEMODA to DEMODD may be included in the demodulation signals DEMOD of FIG. 2 and may be signals which have the same frequency and duty ratio and have different phases. The first to fourth demodulation signals DEMODA to DEMODD may have a 90-degree phase difference therebetween. For example, with respect to the first demodulation signal DEMODA, when the first demodulation signal DEMODA has a 0-degree phase, the second demodulation signal DEMODB may have a 90-degree phase, the third demodulation signal DEMODC may have a 180-degree phase, and the fourth demodulation signal DEMODD may have a 270-degree phase.

The first to fourth storage transistors SS1 to SS4 may store photocharges respectively transferred through the first to fourth transfer transistors TS1 to TS4, and the first to fourth tap transfer transistors TXS1 to TXS4 may transfer photocharges, stored in the first to fourth storage transistors SS1 to SS4, to the first to fourth floating diffusion nodes FD1 to FD4, respectively.

The first to fourth source followers SF1 to SF4 may respectively amplify and output corresponding photocharges to the first to fourth selection transistors SEL1 to SEL4 based on an electric potential based on photocharges accumulated into the first to fourth floating diffusion nodes FD1 to FD4. The first to fourth selection transistors SEL1 to SELA may respectively output first to fourth pixel signals Vout1 to Vout4 through column lines in response to selection control signals.

The unit pixel 111 may accumulate photocharges for a certain period of time, for example, an integration time and may output the first to fourth pixel signals Vout1 to Vout4, generated based on an accumulation result, to a readout circuit (for example, 130 of FIG. 2).

The first to fourth reset transistors RS1 to RS4 may reset the first to fourth floating diffusion nodes FD1 to FD4 to a source voltage VDD. The overflow gate OG may be a transistor for discharging an overflow charge, a source of the overflow gate OG may be connected with the photodiode PD, and a drain of the overflow gate OG may be connected with a source voltage VDD.

In FIG. 3, a pixel having the 4-tap structure is described, but example embodiments are not limited thereto. The image sensor 14 may include pixels having a 2-tap structure or a 3-tap structure.

Figure 4:
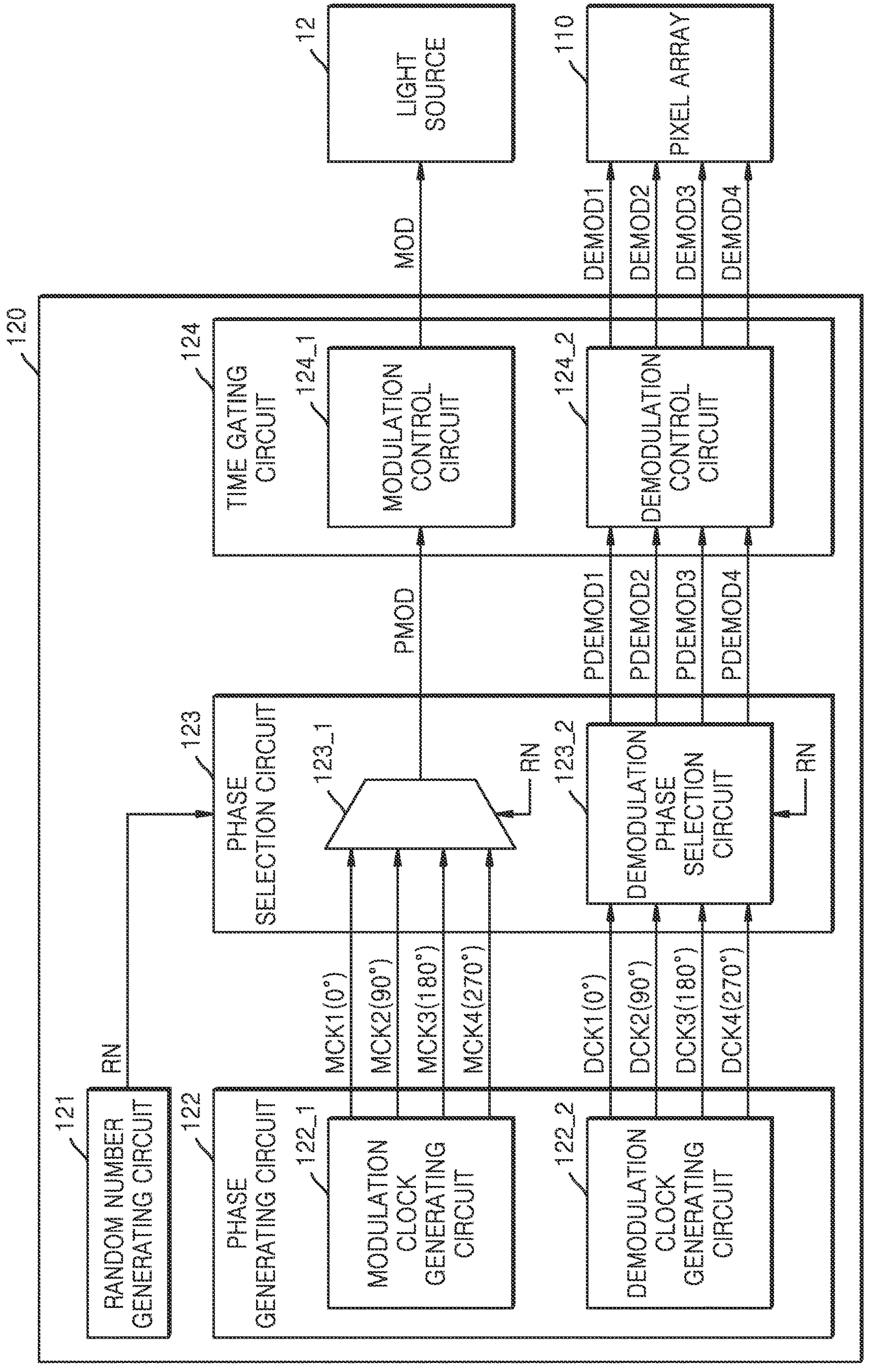
FIG. 4 is a diagram for describing a control circuit included in an image sensor, according to an example embodiment.
Figure 5:
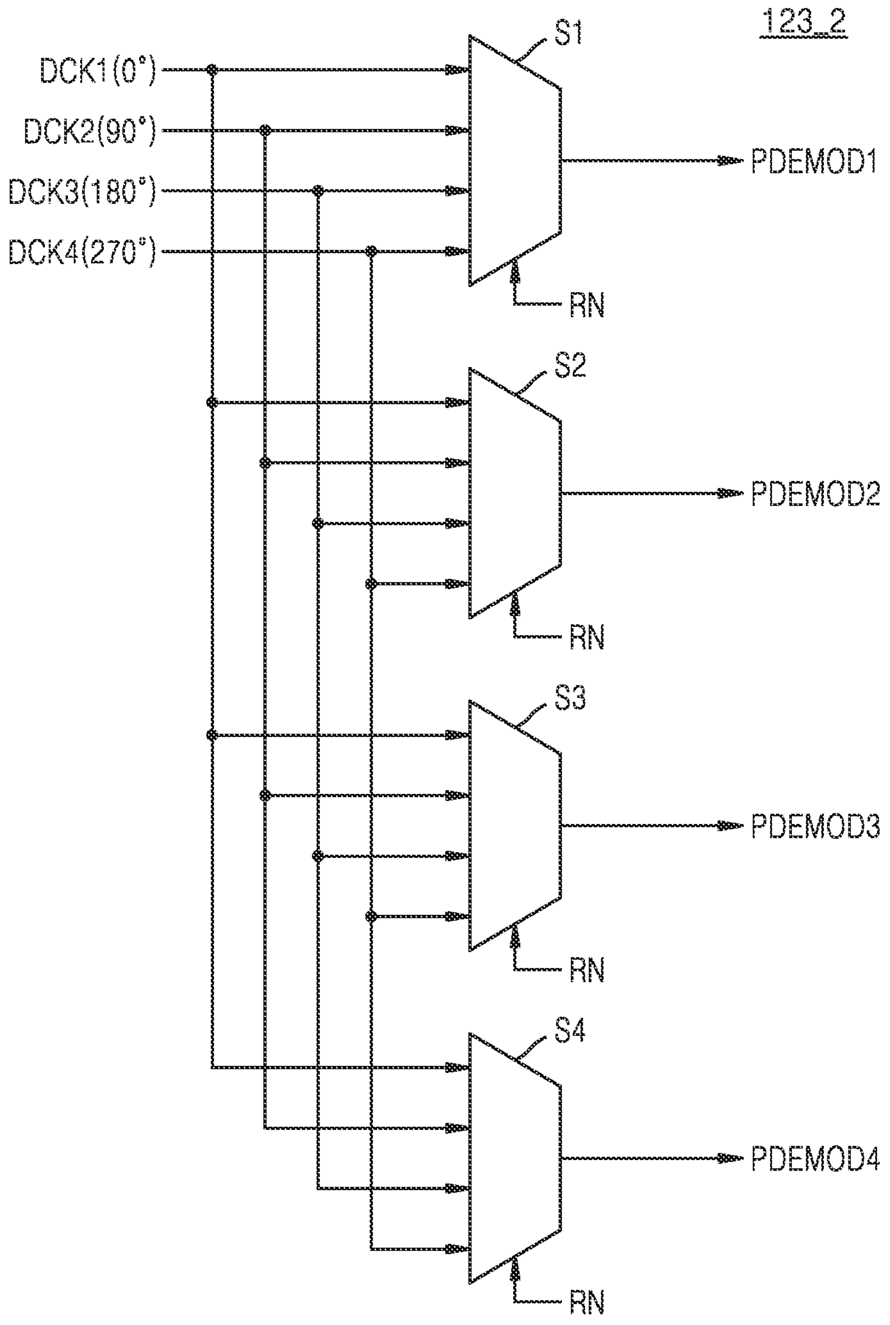
FIG. 5 is a block diagram for describing a demodulation phase selection circuit of FIG. 4.

FIG. 4 is a diagram for describing a control circuit 120 included in an image sensor, according to an example embodiment. FIG. 5 is a block diagram for describing a demodulation phase selection circuit 123_2 of FIG. 4.

Referring to FIG. 4, the control circuit 120 may transfer a modulation signal MOD to a light source 12 and may transfer first to fourth demodulation signals DEMOD1 to DEMOD4 to a pixel array 110. The control circuit 120 may include a random number generating circuit 121, a phase generating circuit 122, a phase selection circuit 123, and a time gating circuit 124.

A plurality of packets may be differentiated from one another for an integration time which defines one frame of a pixel. According to an example embodiment, each of the plurality of packets may correspond to a period of a modulation signal. The random number generating circuit 121 may newly generate a random number RN per packet. For example, the random number generating circuit 121 may generate 2-bit random numbers #1:00, #2:01, #3:10, and #4:11. According to an example embodiment, the number of random numbers generated by the random number generating circuit 121 may be a number corresponding to a phase of a modulation clock signal. The control circuit 120 may include a linear feedback shift register (LFSR) instead of the random number generating circuit 121. The random number generating circuit 121 may generate a packet-based random number for each period of the modulation clock signal.

The phase generating circuit 122 may include a modulation clock generating circuit 122_1 and a demodulation clock generating circuit 122_2. The modulation clock generating circuit 122_1 may generate a plurality of modulation clock signals (for example, first to fourth modulation clock signals MCK1 to MCK4). The first to fourth modulation clock signals MCK1 to MCK4 may have the same frequency and duty ratio and may have different phases. For example, the first modulation clock signal MCK1 may have a 0-degree phase, the second modulation clock signal MCK2 may have a 90-degree phase, the third modulation clock signal MCK3 may have a 180-degree phase, and the fourth modulation clock signal MCK4 may have a 270-degree phase.

The demodulation clock generating circuit 122_2 may generate a plurality of demodulation clock signals (for example, first to fourth demodulation clock signals DCK1 to DCK4). The first to fourth demodulation clock signals DCK1 to DCK4 may have the same frequency and duty ratio and may have different phases. For example, the first demodulation clock signal DCK1 may have a 0-degree phase, the second demodulation clock signal DCK2 may have a 90-degree phase, the third demodulation clock signal DCK3 may have a 180-degree phase, and the fourth demodulation clock signal DCK4 may have a 270-degree phase. In this case, the first to fourth modulation clock signals MCK1 to MCK4 and the first to fourth demodulation clock signals DCK1 to DCK4 may have the same frequency.

The phase selection circuit 123 may include a modulation phase selection circuit 123_1 and a demodulation phase selection circuit 123_2. The modulation phase selection circuit 123_1 may receive the first to fourth modulation clock signals MCK1 to MCK4 and may select one modulation clock signal from among the first to fourth modulation clock signals MCK1 to MCK4 to output as a pre-modulation signal PMOD, based on the random number RN. The pre-modulation signal PMOD may be a modulation clock signal having different phases based on the random number RN.

Referring to FIGS. 4 and 5, the demodulation phase selection circuit 123_2 may receive the first to fourth demodulation clock signals DCK1 to DCK4 and may generate first to fourth pre-demodulation signals PDEMOD1 to PDEMOD4 based on the random number RN. The first to fourth pre-demodulation signals PDEMOD1 to PDEMOD4 may have the same frequency and duty ratio and may have different phases.

Referring to FIG. 5, the demodulation phase selection circuit 123_2 may include first to fourth selection circuits S1 to S4. The first to fourth selection circuits S1 to S4 may each receive the first to fourth demodulation clock signals DCK1 to DCK4.

The first selection circuit S1 may select one demodulation clock signal from among the first to fourth demodulation clock signals DCK1 to DCK4 to generate the first pre-demodulation signal PDEMOD1, based on the random number RN, and the second selection circuit S2 may select one demodulation clock signal from among the first to fourth demodulation clock signals DCK1 to DCK4 to generate the second pre-demodulation signal PDEMOD2, based on the random number RN. The third selection circuit S3 may select one demodulation clock signal from among the first to fourth demodulation clock signals DCK1 to DCK4 to generate the third pre-demodulation signal PDEMOD3, based on the random number RN, and the fourth selection circuit S4 may select one demodulation clock signal from among the first to fourth demodulation clock signals DCK1 to DCK4 to generate the fourth pre-demodulation signal PDEMOD4, based on the random number RN.

In this case, with respect to the first pre-demodulation signal PDEMOD1, the demodulation phase selection circuit 123_2 may generate the first to fourth pre-demodulation signals PDEMOD1 to PDEMOD4 so that the second pre-demodulation signal PDEMOD2 has a phase which is delayed by 90 degrees with respect to a phase of the first pre-demodulation signal PDEMOD1, the third pre-demodulation signal PDEMOD3 has a phase which is delayed by 180 degrees with respect to the phase of the first pre-demodulation signal PDEMOD1, and the fourth pre-demodulation signal PDEMOD4 has a phase which is delayed by 270 degrees with respect to the phase of the first pre-demodulation signal PDEMOD1.

For example, when the first demodulation clock signal DCK1 is selected as the first pre-demodulation signal PDEMOD1, the second to fourth demodulation clock signals DCK2 to DCK4 may be respectively selected as the second to fourth pre-demodulation signals PDEMOD2 to PDEMOD4. Specifically, when the first demodulation clock signal DCK1 is selected as the first pre-demodulation signal PDEMOD1, the second demodulation clock signal DCK2 may be selected as the second pre-demodulation signal PDEMOD2, the third demodulation clock signal DCK3 may be selected as the third pre-demodulation signal PDEMOD3 and the fourth demodulation clock signal DCK4 may be selected as the fourth pre-demodulation signal PDEMOD4. For example, when the second demodulation clock signal DCK2 is selected as the first pre-demodulation signal PDEMOD1, the third, fourth, and first demodulation clock signals DCK3, DCK4, and DCK1 may be respectively selected as the second to fourth pre-demodulation signals PDEMOD2 to PDEMOD4. For example, when the third demodulation clock signal DCK3 is selected as the first pre-demodulation signal PDEMOD1, the fourth, first, and second demodulation clock signals DCK4, DCK1, and DCK2 may be respectively selected as the second to fourth pre-demodulation signals PDEMOD2 to PDEMOD4. Alternatively, for example, when the fourth demodulation clock signal DCK4 is selected as the first pre-demodulation signal PDEMOD1, the first, second, and third demodulation clock signals DCK1, DCK2, and DCK3 may be respectively selected as the second to fourth pre-demodulation signals PDEMOD2 to PDEMOD4.

Referring again to FIG. 4, the time gating circuit 124 may include a modulation control circuit 124_1 and a demodulation control circuit 124_2. The modulation control circuit 124_1 may receive the pre-modulation signal PMOD to generate a modulation signal MOD which is to be applied to the light source 12. The demodulation control circuit 124_2 may receive the first to fourth pre-demodulation signals PDEMOD1 to PDEMOD4 to generate the first to fourth demodulation signals DEMOD1 to DEMOD4 which are to be respectively applied to corresponding unit pixels of the pixel array 110. The modulation control circuit 124_1 and the demodulation control circuit 124_2 may control an application time of each of the modulation signal MOD and the first to fourth demodulation signals DEMOD1 to DEMOD4 to measure a depth of an object located in a desired unambiguous range, based on an unambiguous range to an object which is to be measured. This is described below in more detail with reference to FIGS. 12A to 12D.

According to an example embodiment, each of first demodulation signals DEMOD1 generated by the demodulation control circuit 124_2 may be supplied, as a first demodulation signal (for example, DEMODA of FIG. 3), to a first transfer transistor (for example, TS1 of FIG. 3) of a unit pixel (for example, 111 of FIG. 3) included in a corresponding pixel group. According to an example embodiment, each of second demodulation signals DEMOD2 generated by the demodulation control circuit 124_2 may be supplied, as a second demodulation signal (for example, DEMODB of FIG. 3), to a second transfer transistor (for example, TS2 of FIG. 3) of a unit pixel 111 included in a corresponding pixel group. According to an example embodiment, each of third demodulation signals DEMOD3 generated by the demodulation control circuit 124_2 may be supplied, as a third demodulation signal (for example, DEMODC of FIG. 3), to a third transfer transistor (for example, TS3 of FIG. 3) of a unit pixel 111 included in a corresponding pixel group. According to an example embodiment, each of fourth demodulation signals DEMOD4 generated by the demodulation control circuit 124_2 may be supplied, as a fourth demodulation signal (for example, DEMODD of FIG. 3), to a fourth transfer transistor (for example, TS4 of FIG. 3) of a unit pixel 111 included in a corresponding pixel group.

According to an example embodiment, the control circuit 120 may include the random number generating circuit 121 and the phase selection circuit 123 for randomly selecting clock signals having 0-degree to 270-degree phases, generated in the modulation clock generating circuit 122_1 and the demodulation clock generating circuit 122_2, at every one period or certain period. The random number RN generated by the random number generating circuit 121 may be used for the phase selection circuit 123 to select a phase. According to an example embodiment, the number of random numbers generated by the random number generating circuit 121 may be equal to or different from the number of phase signals used for a ToF operation. According to an example embodiment, a phase difference between a modulation signal and a demodulation signal may be always constant, but phases may be differently applied. In an example embodiment, for convenience of description, an example where a phase difference between a modulation signal and a demodulation signal is constant per random number is described. Also, in an example embodiment, for convenience of description, clock signals having four or more phases have been described above for example, but example embodiments are not limited thereto.

In FIG. 4, for convenience of description, an example which uses four modulation clock signals having four phases and four demodulation clock signals having four phases corresponding thereto has been described, but example embodiments are not limited thereto. According to an example embodiment, N number of modulation clock signals having N number of phases and N number of demodulation clock signals having N number of phases corresponding thereto may be applied, where N may be a natural number of 2 or more.

Figure 6:
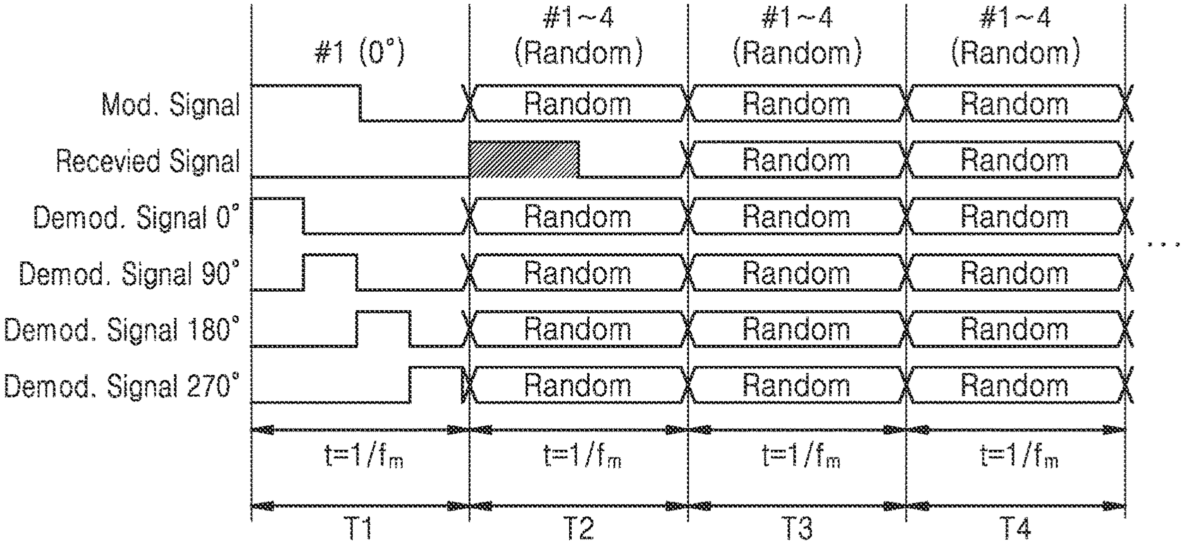
FIG. 6 is a timing diagram for describing an operating condition of a control circuit according to an example embodiment.

FIG. 6 is a timing diagram for describing an operating condition of a control circuit according to an example embodiment.

Mod. Signal illustrated in FIG. 6 may correspond to the modulation clock signal of FIG. 4, and Demod. Signals 0, 90, 180, and 270 may be signals corresponding to the first to fourth demodulation clock signals of FIG. 4. A received signal illustrated in FIG. 6 may denote a reception light signal RX received from an object (200 of FIG. 1). In the timing diagram of FIG. 6, one period of each modulation clock signal may be a reference unit, and in an example embodiment, the reference unit may be referred to as a packet.

According to an example embodiment, a modulation clock signal and demodulation clock signals may be applied in the form of continuous waves. A received signal may be accumulated for an integration time based on a continuous wave. After the integration time, pieces of accumulated information may be converted into a digital signal by a readout circuit of a sensor, and phase information about a depth may be checked through a converted value.

Referring to the timing diagram of FIG. 6, in a first period T1 of FIG. 6, the received signal may maintain a first level (for example, a logic low level). In this case, a modulation clock signal Mod. Signal may be a modulation clock signal corresponding to a 0-degree phase, and first to fourth demodulation clock signals Demod. Signal 0, 90, 180, and 270 may be respectively demodulation clock signals corresponding to 0 degrees, 90 degrees, 180 degrees, and 270 degrees.

In the first period T1 of FIG. 6, the received signal maintaining the first level may denote that the received signal is delayed by the excess of one period of a modulation clock signal. According to an example embodiment, the received signal maintaining the first level in one period may denote that the received signal is received to be greater than a predetermined unambiguous range. According to an example embodiment, the received signal of FIG. 6 may be a totally delayed signal.

According to an example embodiment, in a case where the received signal is delayed by the excess of one period of the modulation clock signal, a phase selection circuit (123 of FIG. 4) may select and control a signal so that all of a modulation clock signal and corresponding demodulation clock signals are randomly applied in sequential periods T2, T3, T4, . . . subsequent thereto, and thus, signals subsequent thereto may become noise.

According to an example embodiment, as a frequency of the modulation clock signal increases, a period may be shortened, and thus, an unambiguous range capable of measurement may be reduced. An object in a range farther away from the measurable unambiguous range may be again re-measured from 0 m due to a wrapping signal caused by a phase folding phenomenon where $2\pi$ returns to 0 again, and thus, abnormal depth information may be provided to a user. According to an example embodiment, only depth information about an object in an unambiguous range may be received by substituting received signals, deviating from $2\pi$, into random noise, and thus, accuracy may increase. According to an example embodiment, depth information deviating from an unambiguous range may be ignored while maintaining an advantage of a continuous wave (CW) scheme, and thus, only accurate depth information may be obtained. Also, only depth information about a desired distance range may be obtained through signal control, and thus, there may be a good effect in extending an unambiguous range or in use despite bad weather.

Figure 7A:
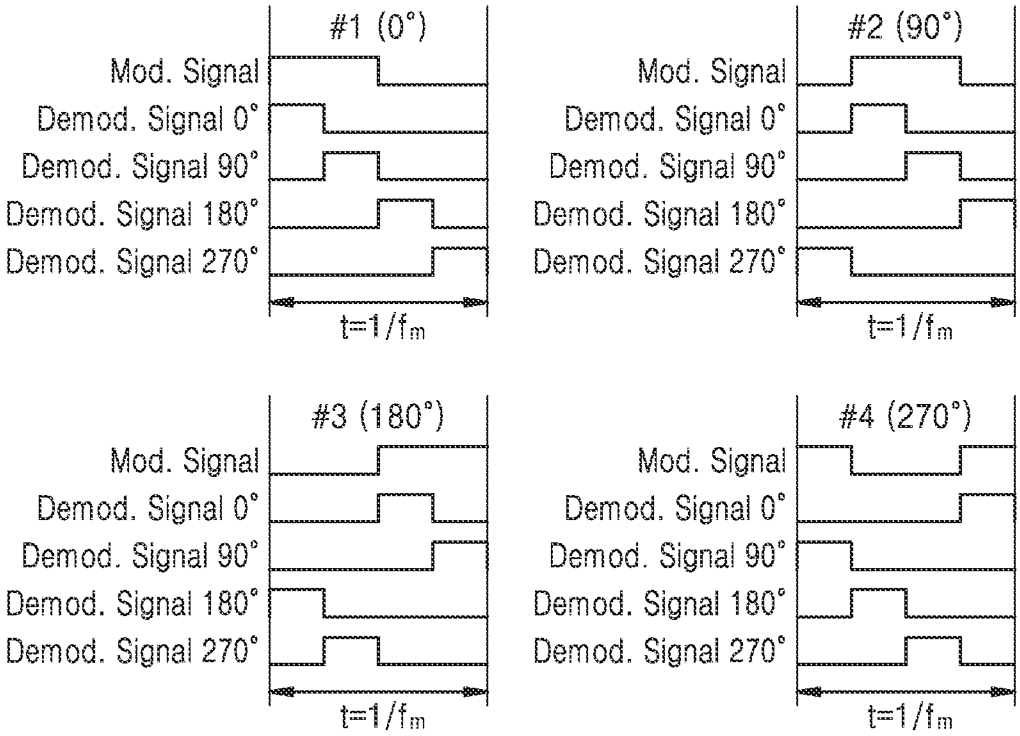
FIG. 7A is a timing diagram for describing a modulation clock signal and demodulation clock signals corresponding to each phase, according to an example embodiment.

FIG. 7A is a timing diagram for describing a modulation clock signal and demodulation clock signals corresponding to each phase, according to an example embodiment.

Referring to FIG. 7A, a modulation clock signal and demodulation clock signals having a phase corresponding to each random number may be provided. As shown in FIG. 7A, the number of random numbers may be provided as four, and a modulation clock signal and the demodulation clock signals may correspond to 0 degrees, 90 degrees, 180 degrees, and 270 degrees according to the random numbers.

For example, when a random number RN is 1 (#1), a phase of a modulation clock signal Mod. Signal may be 0 degrees, a phase of a first demodulation clock signal Demod. Signal 0 may be 0 degrees, a phase of a second demodulation clock signal Demod. Signal 90 may be 90 degrees, a phase of a third demodulation clock signal Demod. Signal 180 may be 180 degrees, and a phase of a fourth demodulation clock signal Demod. Signal 270 may be 270 degrees.

For example, when a random number RN is 2 (#2), a phase of a modulation clock signal Mod. Signal may be 90 degrees, a phase of a first demodulation clock signal Demod. Signal 0 may be 90 degrees, a phase of a second demodulation clock signal Demod. Signal 90 may be 180 degrees, a phase of a third demodulation clock signal Demod. Signal 180 may be 270 degrees, and a phase of a fourth demodulation clock signal Demod. Signal 270 may be 0 degrees.

For example, when a random number RN is 3 (#3), a phase of a modulation clock signal Mod. Signal may be 180 degrees, a phase of a first demodulation clock signal Demod. Signal 0 may be 180 degrees, a phase of a second demodulation clock signal Demod. Signal 90 may be 270 degrees, a phase of a third demodulation clock signal Demod. Signal 180 may be 0 degrees, and a phase of a fourth demodulation clock signal Demod. Signal 270 may be 90 degrees.

Also, for example, when a random number RN is 4 (#4), a phase of a modulation clock signal Mod. Signal may be 270 degrees, a phase of a first demodulation clock signal Demod. Signal 0 may be 270 degrees, a phase of a second demodulation clock signal Demod. Signal 90 may be 0 degrees, a phase of a third demodulation clock signal Demod. Signal 180 may be 90 degrees, and a phase of a fourth demodulation clock signal Demod. Signal 270 may be 180 degrees.

A period of each of a modulation clock signal and a demodulation clock signal may be inversely proportional to a frequency of the modulation clock signal. In FIG. 7A, an example of a modulation clock signal and demodulation clock signals applied to a 4-tap pixel array is illustrated. As shown in FIG. 7A, periods of modulation clock signals respectively corresponding to random numbers may be equal to one another. In an example embodiment, a duty of a demodulation clock signal may be 25%, but example embodiments may be applied to a 2-tap pixel array having a duty of 50% as well as a 4-tap pixel array and the number of taps or a duty ratio of a signal may be variously changed.

Figure 7B:
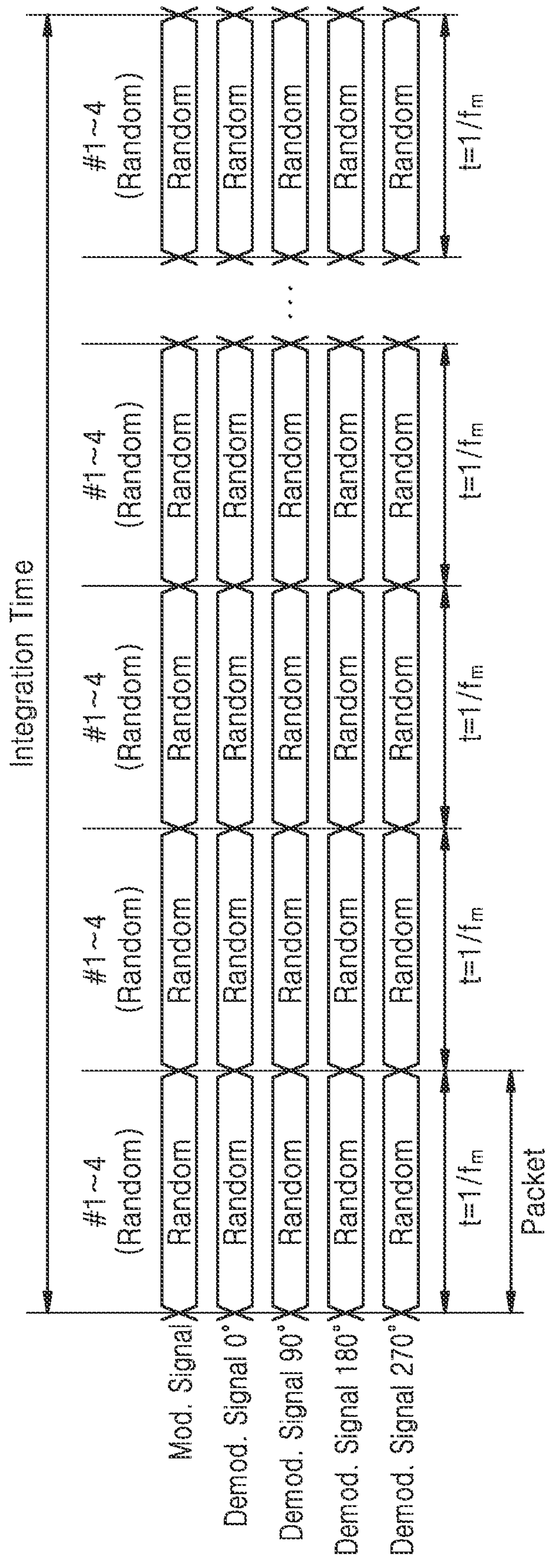
FIG. 7B is a timing diagram for describing a signal control method to which the signals of FIG. 7A are applied.
Figure 7C:
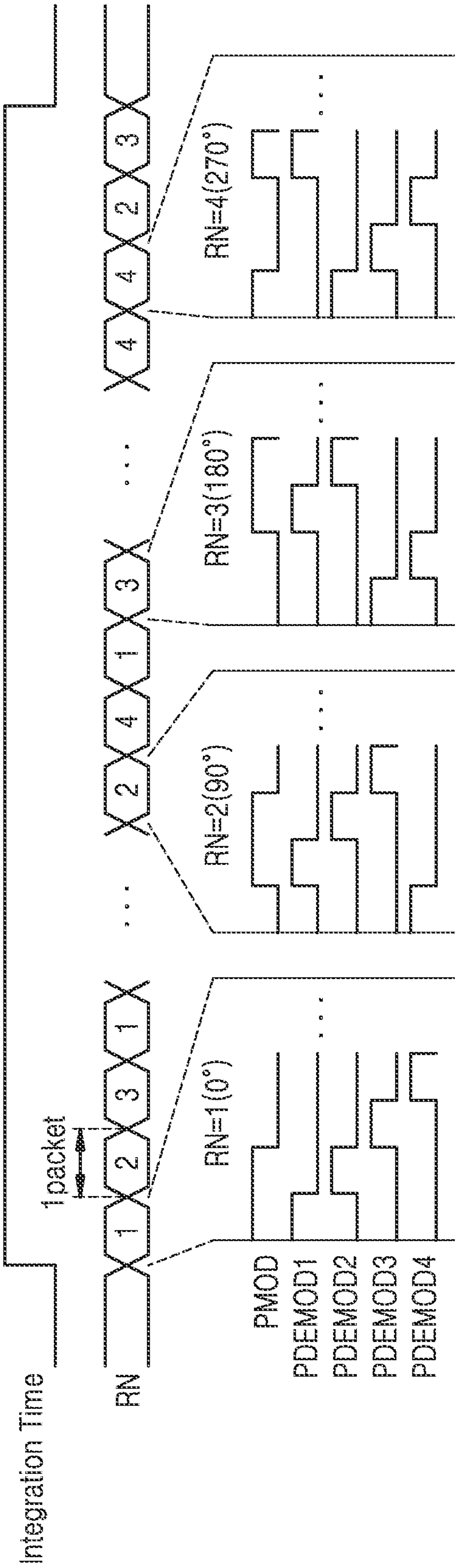
FIG. 7C is a timing diagram for describing a pre-modulation signal and pre-demodulation signals based on random numbers, according to an example embodiment.

FIG. 7B is a timing diagram for describing a signal control method to which the signals of FIG. 7A are applied. FIG. 7C is a timing diagram for describing a pre-modulation signal and pre-demodulation signals based on random numbers, according to an example embodiment. According to an example embodiment, FIG. 7C may denote an operation timing diagram between the phase selection circuit 123 and the time gating circuit 124 of FIG. 4.

Referring to FIG. 7B, an integration time may be divided by units of a period t inversely proportional to a frequency $f_m$ of a modulation clock signal. Each of divided units may be referred to as a packet. In each packet, a control circuit may perform control to apply a modulation clock signal and a demodulation clock signal each corresponding to a random number.

Referring to FIG. 7C, an integration time may be divided into a plurality of packets, and a random number RN may be newly assigned to each of the plurality of packets. In an example embodiment, the random number RN may be 2 bits, and in FIG. 7C, the random number RN may be represented by digits of 1 to 4. However, example embodiments are not limited thereto, and the number of random numbers RN may be variously changed.

Referring to FIGS. 4 to 7C, the pre-modulation signal PMOD and the plurality of pre-demodulation signals (for example, the first to fourth pre-demodulation signals PDEMOD1 to PDEMOD4) may be changed based on the random number RN together. The pre-modulation signal PMOD and the first to fourth pre-demodulation signals PDEMOD1 to PDEMOD4 may have the same period. In an example embodiment, the pre-modulation signal PMOD may have a duty ratio of about 50%, and each of the first to fourth pre-demodulation signals PDEMOD1 to PDEMOD4 may have a duty ratio of about 25%. However, example embodiments are not limited thereto, and a duty ratio of the pre-modulation signal PMOD may be changed, and a duty ratio of each of the first to fourth pre-demodulation signals PDEMOD1 to PDEMOD4 may be changed.

The pre-modulation signal PMOD and the first to fourth pre-demodulation signals PDEMOD1 to PDEMOD4 may be changed based on the random number RN together. According to an example embodiment, when a delayed reception signal is applied, random noise processing may be performed by applying the random number RN in a packet of each of applied signals subsequent thereto, and thus, the delayed reception signal may converge to a random noise component and the accuracy of depth measurement of the image sensor according to an example embodiment may be enhanced.

A modulation clock signal and a demodulation clock signal according to an example embodiment may be changed in phase, based on the random number RN. The random number RN may be provided as 2 bits, and thus, each of the modulation clock signal and the demodulation clock signal may have four phases of 0 degrees, 90 degrees, 180 degrees, and 270 degrees at a 90-degree interval. Alternatively, the random number RN may be provided as 3 bits, and thus, each of the modulation clock signal and the demodulation clock signal may have eight phases of 0 degrees, 45 degrees, 90 degrees, 135 degrees, 180 degrees, 225 degrees, 270 degrees, and 315 degrees at a 45-degree interval, but is not limited thereto. Such a phase change may denote that a phase of the modulation clock signal and a phase of the demodulation clock signal are changed together but is not limited thereto. According to an example embodiment, a packet, which is a unit designated as a random number, may not exceed one period fundamentally, and thus, wrapped reception signals may be substituted into a random noise component.

Figure 8:
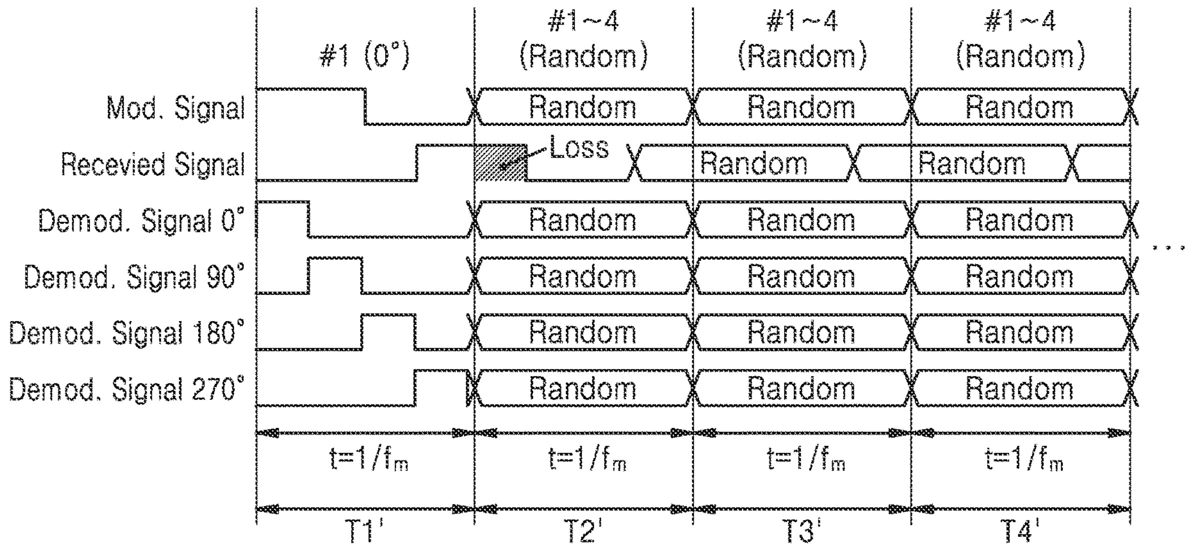
FIG. 8 is a timing diagram for describing an operating condition of a control circuit according to an example embodiment.

FIG. 8 is a timing diagram for describing an operating condition of a control circuit according to an example embodiment. In describing FIG. 8, descriptions which are the same as or similar to the descriptions of FIG. 6 are omitted.

Referring to FIG. 8, a received signal may be shifted from a first level to a second level in a first period T1' and may enter a second period T2' with maintaining the second level. Such a signal may be a reception signal which is not totally delayed. In this case, in a reception signal Loss, which is not wrapped, information may be substituted into a random noise component based on a packet, and thus, a demodulation contrast DC may decrease and depth noise may increase. FIGS. 9A to 9D show a modulation signal and a demodulation signal applicable to an example embodiment. Referring to FIGS. 9A to 9D, information corresponding to the reception signal Loss, which is not wrapped, of FIG. 8 may be obtained also.

Figure 9A:
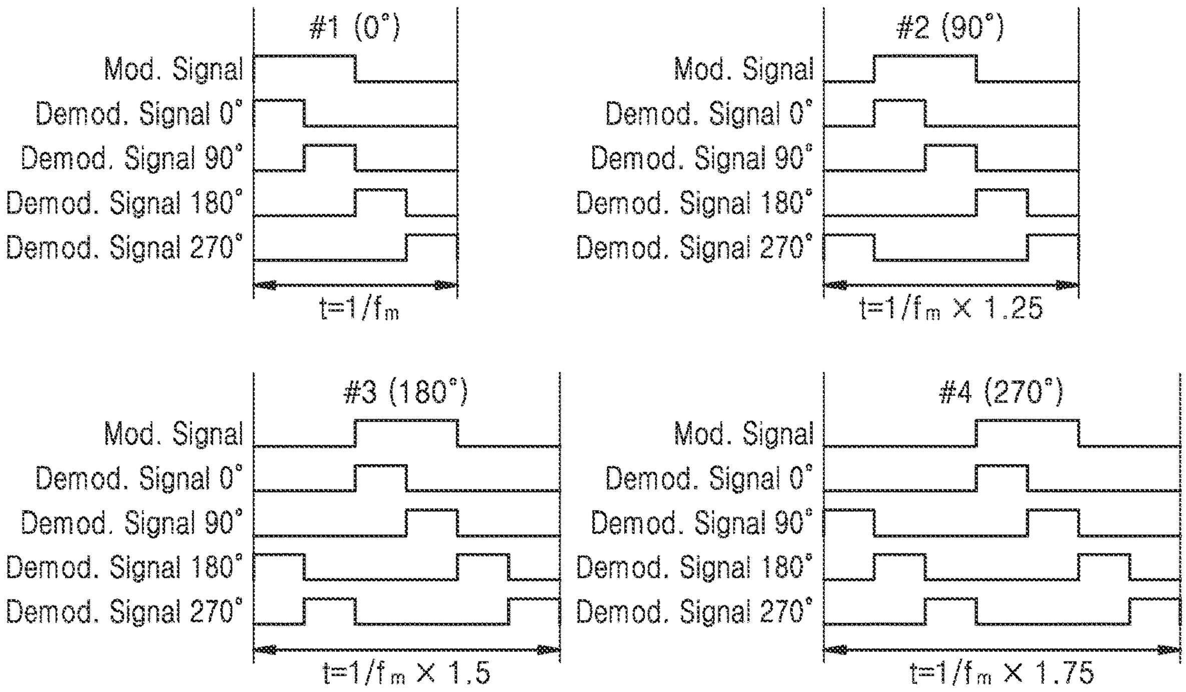
FIG. 9A is a timing diagram for describing a modulation clock signal and demodulation clock signals corresponding to each phase, according to an example embodiment.

FIG. 9A is a timing diagram for describing a modulation clock signal and demodulation clock signals corresponding to each phase, according to an example embodiment. In describing FIG. 9A, descriptions which are the same as or similar to the descriptions of FIG. 7A are omitted.

Referring to FIG. 9A, a modulation clock signal and demodulation clock signals having a phase corresponding to each random number may be provided. As shown in FIG. 9A, the number of random numbers may be provided as four, and a modulation clock signal and demodulation clock signals may correspond to 0 degrees, 90 degrees, 180 degrees, and 270 degrees according to the random numbers.

Referring to FIG. 9A, periods of modulation clock signals corresponding to 0 degrees, 90 degrees, 180 degrees, and 270 degrees respectively corresponding to random numbers may be differently provided. As shown in FIG. 9A, a period of an applied signal may be differently set for each phase in each packet, and thus, pieces of information about signals in an unambiguous range may be totally obtained.

For example, when a random number RN is 1 (#1), a phase of a modulation clock signal Mod. Signal may be 0 degrees, a phase of a first demodulation clock signal Demod. Signal 0 may be 0 degrees, a phase of a second demodulation clock signal Demod. Signal 90 may be 90 degrees, a phase of a third demodulation clock signal Demod. Signal 180 may be 180 degrees, and a phase of a fourth demodulation clock signal Demod. Signal 270 may be 270 degrees. In this case, a period may be $$\frac{1}{f_m}.$$

Also, $f_m$ may be a frequency of a modulation clock signal.

For example, when a random number RN is 2 (#2), a phase of a modulation clock signal Mod. Signal may be 90 degrees, a phase of a first demodulation clock signal Demod. Signal 0 may be 90 degrees, a phase of a second demodulation clock signal Demod. Signal 90 may be 180 degrees, a phase of a third demodulation clock signal Demod. Signal 180 may be 270 degrees, and a phase of a fourth demodulation clock signal Demod. Signal 270 may be 0 degrees. In this case, a period may be $$\frac{1}{f_m} \times 1.25.$$

For example, when a random number RN is 3 (#3), a phase of a modulation clock signal Mod. Signal may be 180 degrees, a phase of a first demodulation clock signal Demod. Signal 0 may be 180 degrees, a phase of a second demodulation clock signal Demod. Signal 90 may be 270 degrees, a phase of a third demodulation clock signal Demod. Signal 180 may be 0 degrees, and a phase of a fourth demodulation clock signal Demod. Signal 270 may be 90 degrees. In this case, a period may be $$\frac{1}{f_m} \times 1.5.$$

Also, for example, when a random number RN is 4 (#4), a phase of a modulation clock signal Mod. Signal may be 270 degrees, a phase of a first demodulation clock signal Demod. Signal 0 may be 270 degrees, a phase of a second demodulation clock signal Demod. Signal 90 may be 0 degrees, a phase of a third demodulation clock signal Demod. Signal 180 may be 90 degrees, and a phase of a fourth demodulation clock signal Demod. Signal 270 may be 180 degrees. In this case, a period may be $$\frac{1}{f_m} \times 1.75.$$

An example embodiment is described where a period increases progressively as a random number increases, but example embodiments are not limited thereto. According to an example embodiment, periods of modulation clock signals corresponding to a random number may be determined based on a length of the reception signal Loss, which is not wrapped, of FIG. 8.

Figure 9B:
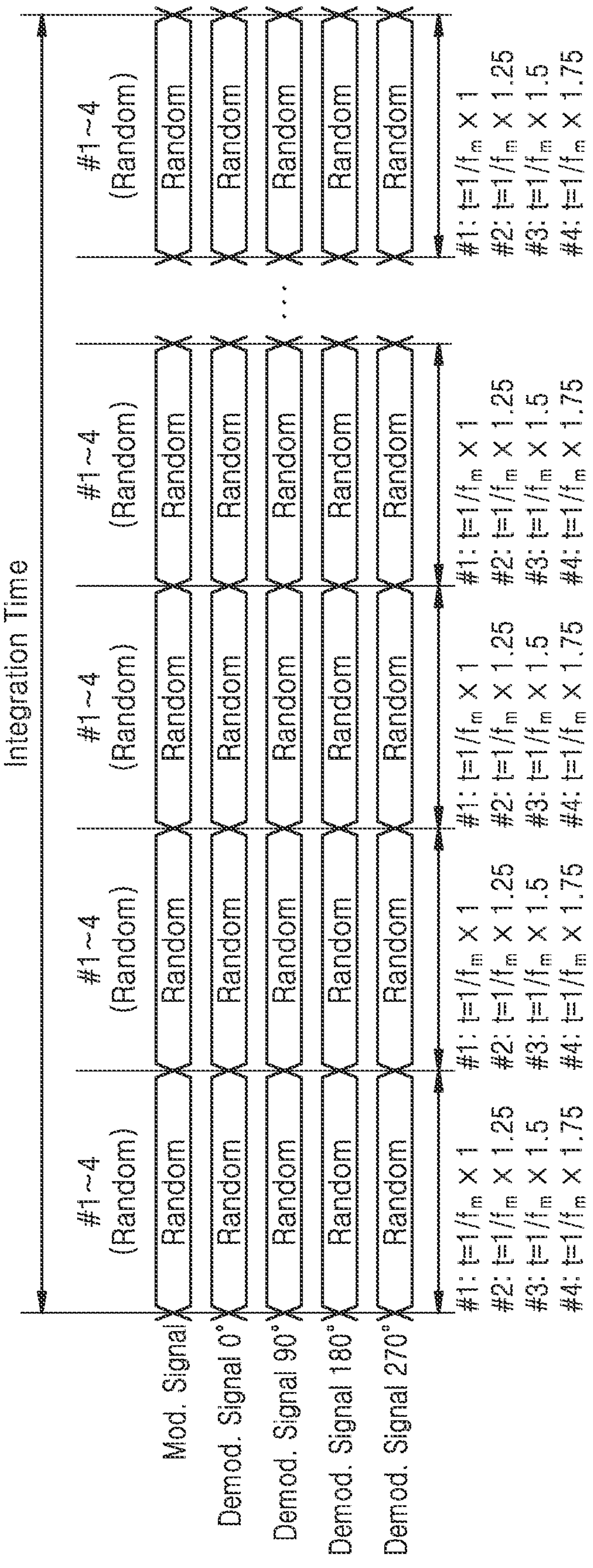
FIG. 9B is a timing diagram for describing a signal control method to which the signals of FIG. 9A are applied.
Figure 9C:
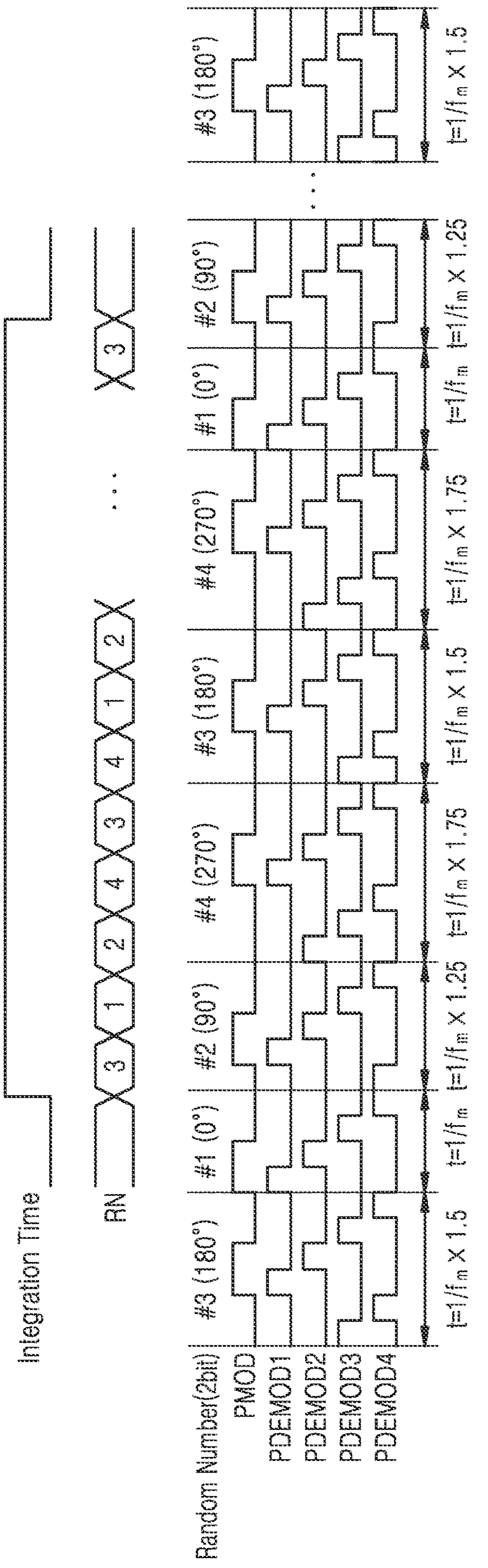
FIG. 9C is a timing diagram for describing a pre-modulation signal and pre-demodulation signals based on random numbers, according to an example embodiment.

FIG. 9B is a timing diagram for describing a signal control method to which the signals of FIG. 9A are applied. FIG. 9C is a timing diagram for describing a pre-modulation signal and pre-demodulation signals based on random numbers, according to an example embodiment.

Referring to FIG. 9B, a random number may be applied in each packet, and a modulation clock signal and a demodulation clock signal each having a phase corresponding thereto may be applied. In this case, a modulation clock signal and a demodulation clock signal respectively corresponding to random numbers may have different periods for each of the random numbers.

Referring to FIG. 9C, an integration time may be divided into a plurality of packets, and a random number RN may be newly assigned to each of the plurality of packets. In an example embodiment, the random number RN may be 2 bits, and in FIG. 9C, the random number RN may be represented by digits of 1 to 4. Referring to FIG. 9C, it may be checked that a pre-modulation signal PMOD and pre-demodulation signals PDEMOD1 to PDEMOD4 corresponding to each random number are applied by packets. Periods of the pre-modulation signal PMOD and the pre-demodulation signals PDEMOD1 to PDEMOD4 corresponding to each random number are differently set by packets.

Figure 10:
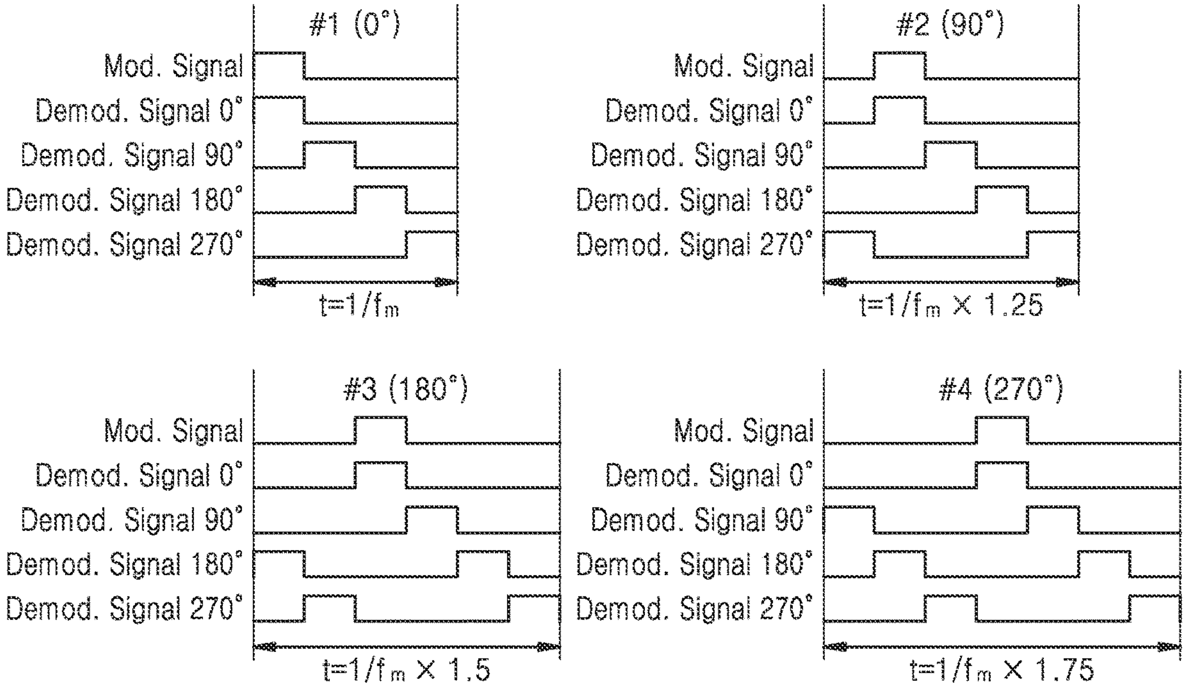
FIG. 10 is a timing diagram for describing a modulation clock signal and demodulation clock signals corresponding to each phase, according to an example embodiment.

FIG. 10 is a timing diagram for describing a modulation clock signal and demodulation clock signals corresponding to each phase, according to an example embodiment.

In describing FIG. 10, descriptions which are the same as or similar to the descriptions of FIG. 9A are omitted.

Referring to FIG. 10, a modulation clock signal and demodulation clock signals corresponding to each random number may be provided. In contrast to the discussion above with respect to FIG. 9A, the modulation clock signal and the demodulation clock signals corresponding to each random number may have a difference in duty ratio of a modulation clock signal Mod. Signal. Referring to FIG. 10, a duty ratio of each of modulation clock signals Mod. Signal corresponding to each random number may be about 50% of a duty ratio of the modulation clock signal in FIG. 9A. According to an example embodiment, duty ratios of the modulation clock signals Mod. Signal of FIG. 10 may be the same as duty ratios of demodulation clock signals Demod. Signal 0, 90, 180, and 270 of FIG. 10.

FIGS. 11A to 11D are timing diagrams for describing a modulation clock signal and demodulation clock signals corresponding to each phase, according to an example embodiment.

Figure 11A:
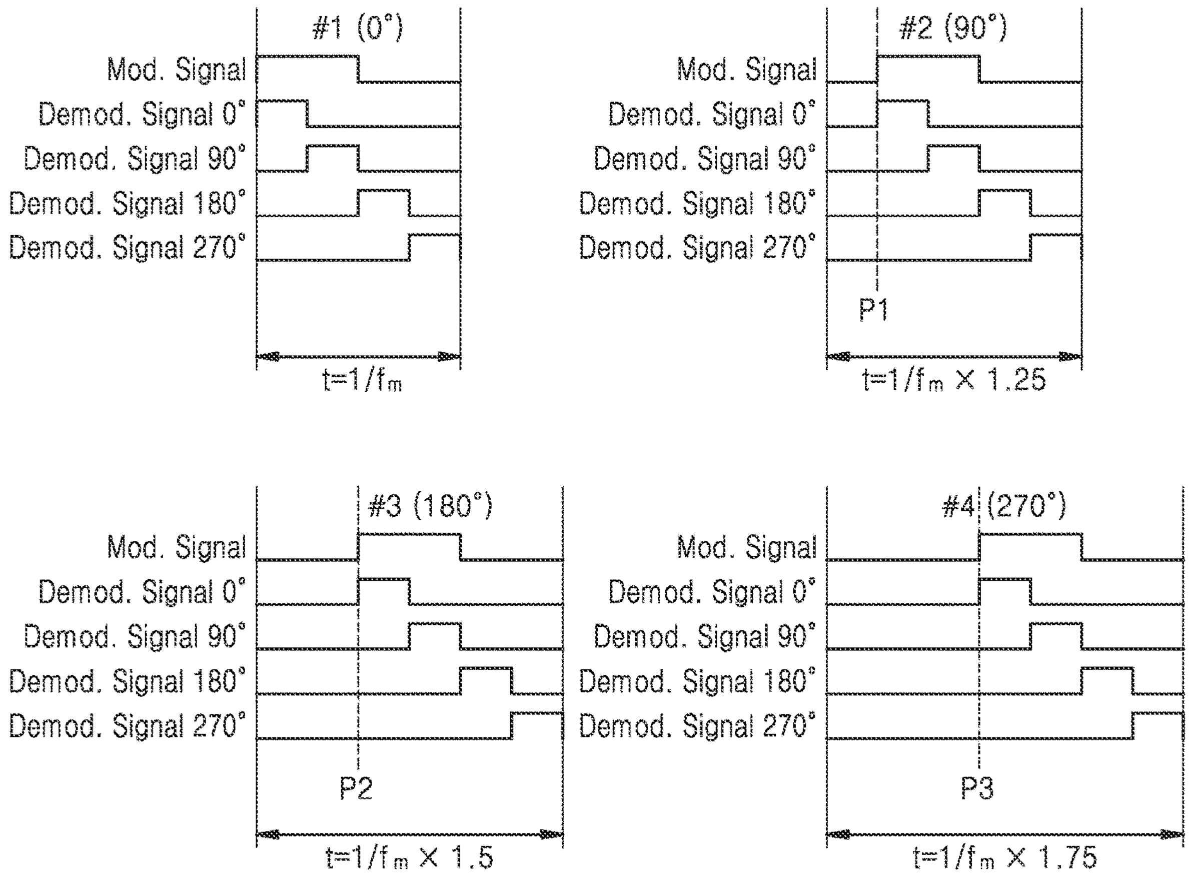
FIGS. 11A, 11B, 11C and 11D are timing diagrams for describing a modulation clock signal and demodulation clock signals corresponding to each phase, according to an example embodiment.
Figure 11B:
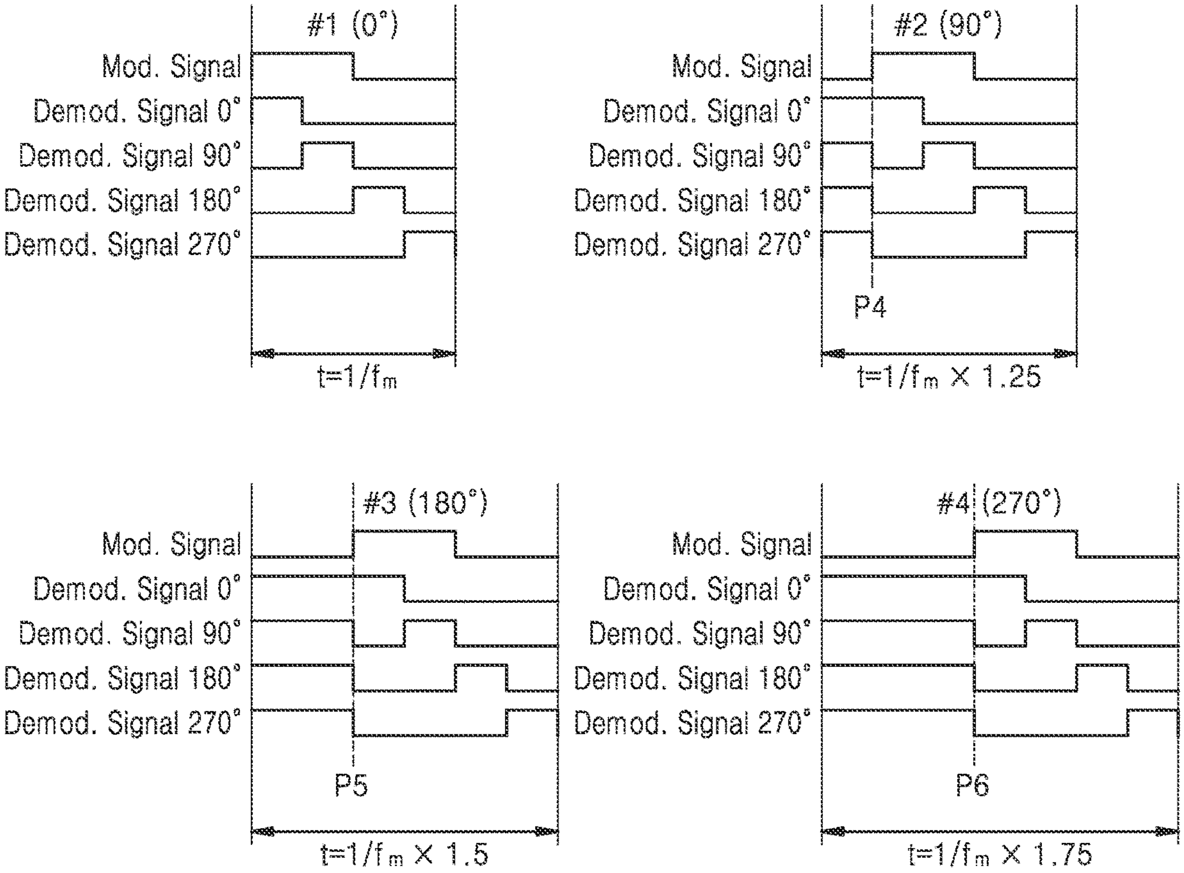

FIGS. 11A to 11D are described below with reference to FIG. 9A. Referring to FIGS. 9A and 11A, there may be a difference in time, at which all of demodulation clock signals are set to a low level, before times P1, P2, and P3 at which modulation clock signals respectively having 90-degree, 180-degree, and 270-degree phases, except a modulation clock signal having a 0-degree phase, are shifted from a first level (for example, logic low) to a second level (for example, logic high). Referring to FIGS. 9A and 11B, there may be a difference in time, at which demodulation clock signals are set to a high level, before times P4, P5, and P6 at which modulation clock signals respectively having 90-degree, 180-degree, and 270-degree phases, except a modulation clock signal having a 0-degree phase, are shifted from a first level to a second level.

Figure 11C:
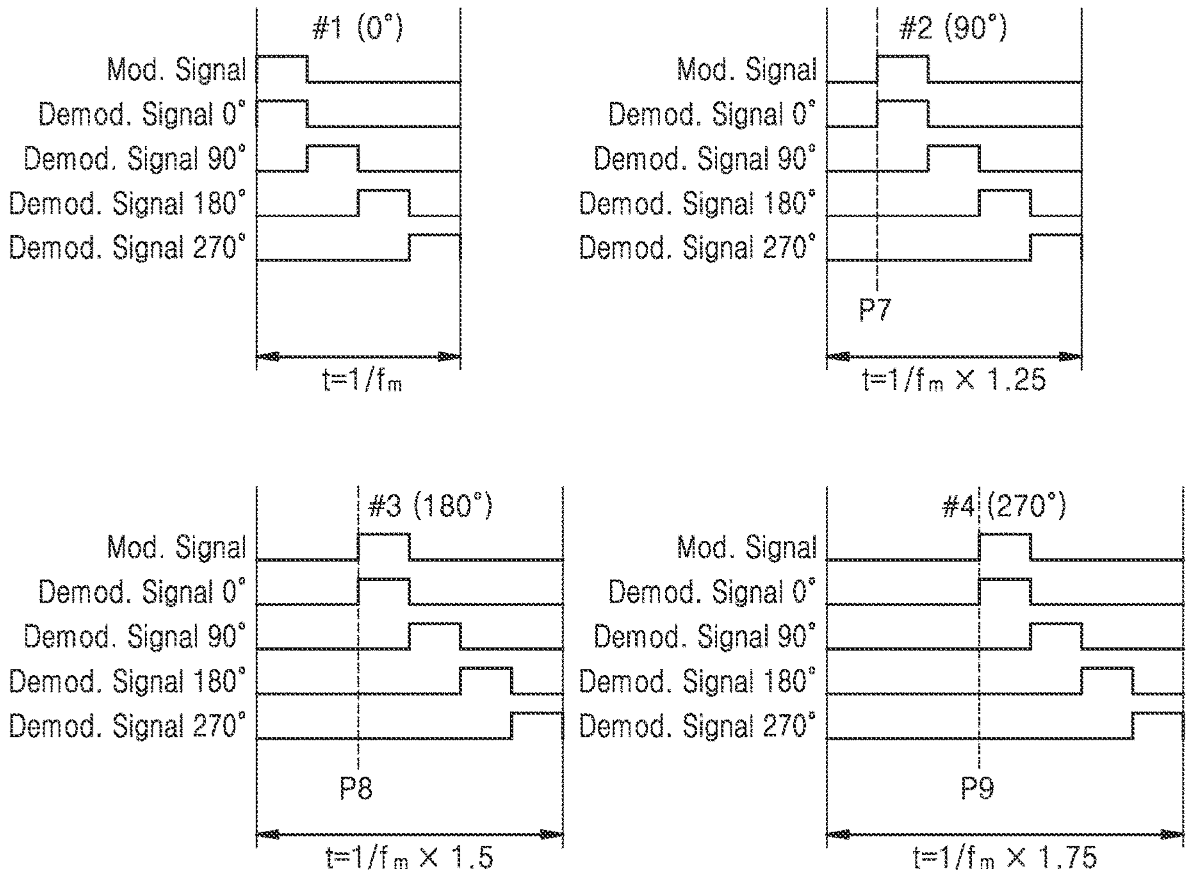
Figure 11D:
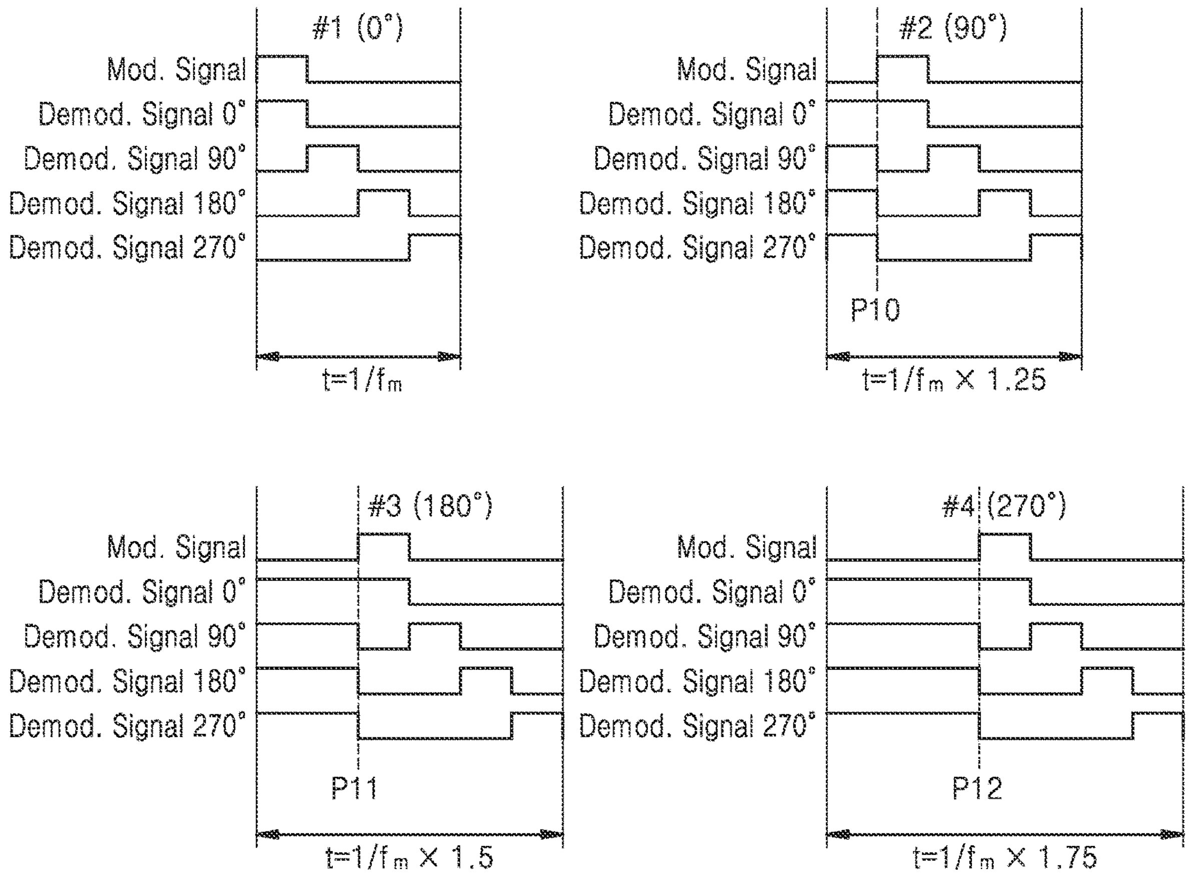

FIGS. 11C and 11D are described below with reference to FIG. 10. Referring to FIGS. 10 and 11C, there may be a difference in time, at which all of demodulation clock signals are set to a low level, before times P7, P8, and P9 at which modulation clock signals respectively having 90-degree, 180-degree, and 270-degree phases, except a modulation clock signal having a 0-degree phase, are shifted from a first level (for example, logic low) to a second level (for example, logic high). Referring to FIG. 10 and FIG. 11D, there may be a difference in time, at which all of demodulation clock signals are set to a high level, before times P10, P11, and P12 at which modulation clock signals respectively having 90-degree, 180-degree, and 270-degree phases, except a modulation clock signal having a 0-degree phase, are shifted from a first level (for example, logic low) to a second level (for example, logic high).

According to an example embodiment, with respect to a modulation clock signal where a period is more than or equal to one period, in a case where a phase of a modulation clock signal is 90 degrees, 180 degrees, and 270 degrees instead of 0 degrees, a front end of a corresponding demodulation clock signal may be maintained at a low level or a high level at a time at which a first level is shifted to a second level, and thus, the same effect as the description above with respect to FIG. 9A and FIG. 10 may be obtained. Also, referring to FIGS. 11A to 11D, performance may be improved in operation of a time gating circuit described below. The modulation clock signal where a period is more than or equal to one period means that when the period t at #1 in FIG. 11A is set to one period, this means that the periods at #2, #3, and #4 in FIG. 11A are one period or more at #1.

Figure 12A:
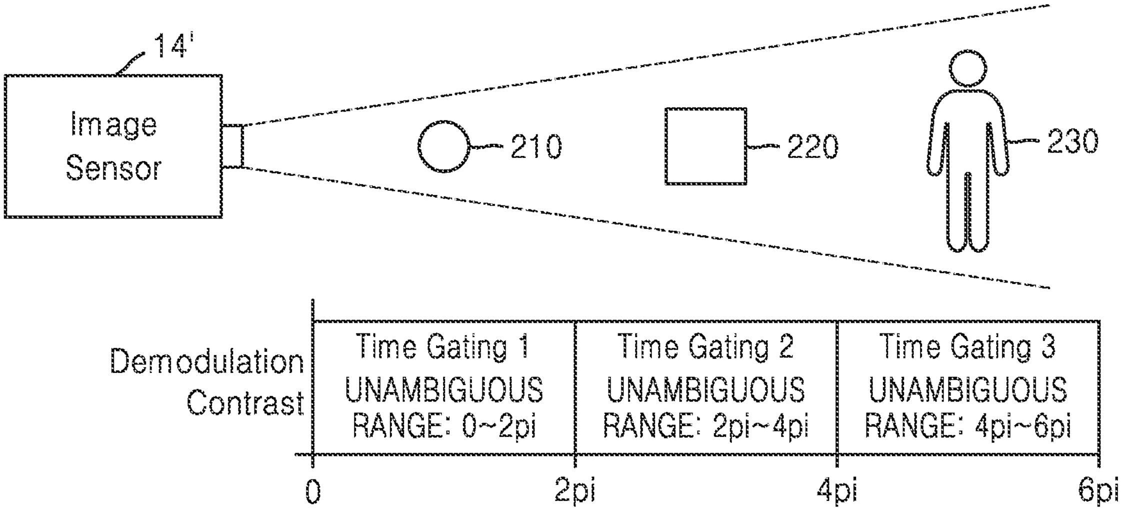
FIG. 12A is a diagram for describing an operation of searching for objects in an unambiguous range within various ranges by using a camera module, according to an example embodiment.

FIG. 12A is a diagram for describing an operation of searching for objects in an unambiguous range within various ranges by using a camera module, according to an example embodiment.

FIG. 12A illustrates an image sensor 14' according to an example embodiment, a first object 210 disposed in a first unambiguous range from the image sensor 14', a second object 220 disposed in a second unambiguous range, and a third object 230 disposed in a third unambiguous range. According to an example embodiment, the first unambiguous range may correspond to a range of about 0 pi to about 2 pi, the second unambiguous range may correspond to a range of about 2 pi to about 4 pi, and the third unambiguous range may correspond to a range of about 4 pi to about 6 pi. In an example embodiment, a phase difference may be set to an integer multiple of 2 pi but is not limited to an integer multiple.

Referring to FIG. 12A, a depth of an object disposed in a desired range may be measured by controlling an application time of each of a pre-modulation signal and pre-demodulation signals so as to measure each of the first object 210 disposed in the first unambiguous range, the second object 220 disposed in the second unambiguous range, and the third object 230 disposed in the third unambiguous range. According to an example embodiment, the first object 210 disposed in the first unambiguous range may be measured in depth based on a first time gating method. The second object 220 disposed in the second unambiguous range may be measured in depth, based on a second time gating method. The third object 230 disposed in the third unambiguous range may be measured in depth, based on a third time gating method.

According to an example embodiment, a packet of each of a pre-modulation signal and a pre-demodulation signal may be intentionally controlled to be staggered, and thus, only a certain range may be detected. This may be applied to the time gating circuit 124 of FIG. 4. The time gating circuit 124 may perform control so that only depth information about a desired range is obtained by staggering a pre-modulation signal and a pre-demodulation signal by packet units. Therefore, an offset may be corrected, and information about a long range may be obtained based on only a single frequency. This may be expanded and applied despite bad weather or various external environments. Accordingly, only a desired depth region may be measured without a folding error, and thus, the convenience of use may increase. Also, as time gating is applied, accurate information may be obtained despite bad weather or passing through glass.

Figure 12B:
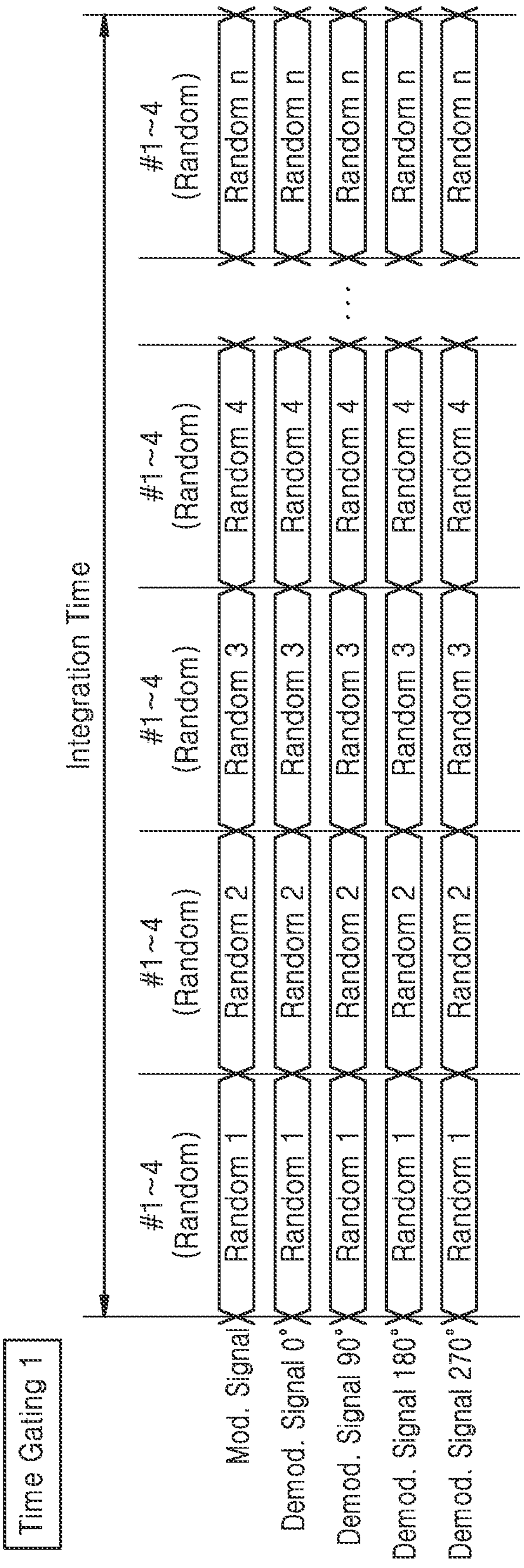
FIGS. 12B, 12C and 12D are timing diagrams for describing a signal control method for searching for objects in an unambiguous range within various ranges of FIG. 12A.
Figure 12C:
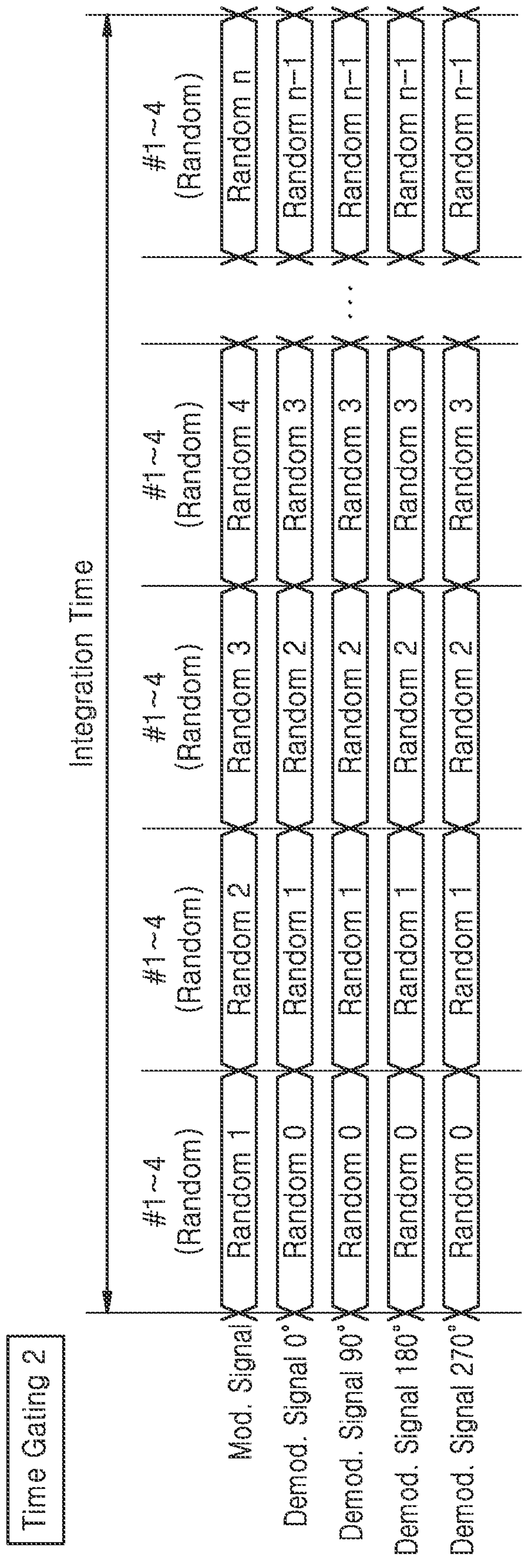
Figure 12D:
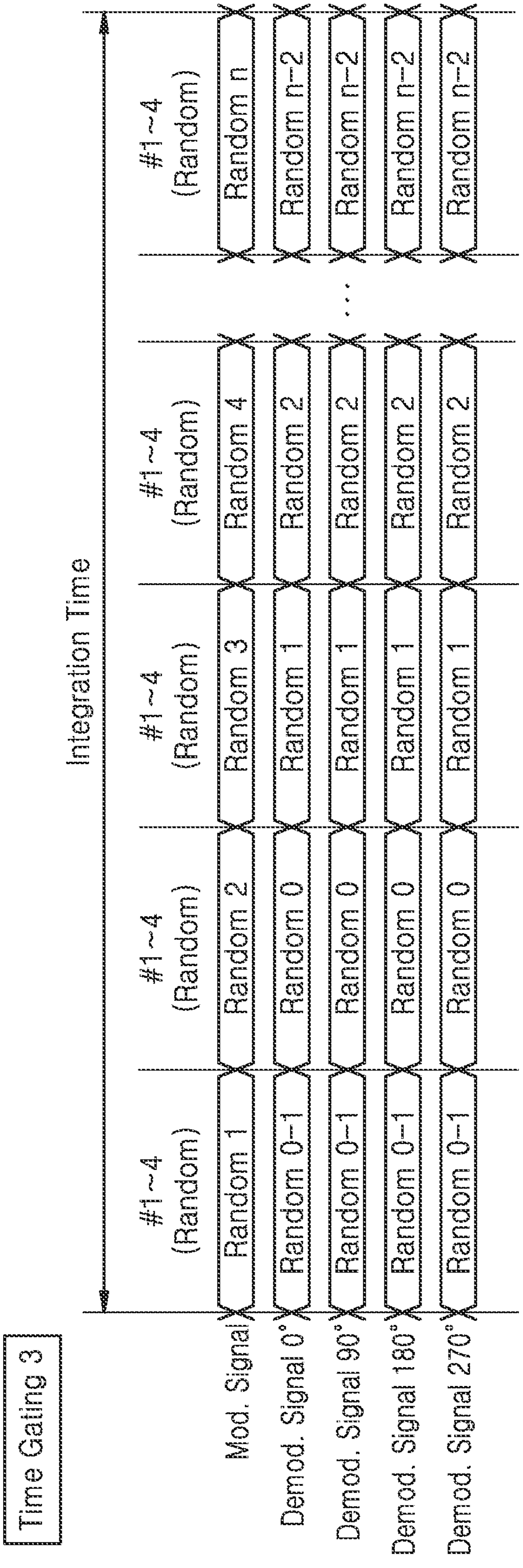

FIGS. 12B to 12D are timing diagrams for describing a signal control method for searching for objects in an unambiguous range within various ranges of FIG. 12A.

Referring to FIG. 12B, a first time gating method for measuring a first object 210 disposed in a first unambiguous range is illustrated. Referring to FIG. 12B, as described above, by randomly applying each pre-modulation signal and a corresponding pre-demodulation signal by packets, random noise processing may be performed on a signal which is greater than or equal to a predetermined value, and thus, only signals of less than the predetermined value may be measured. That is, in FIG. 12B, control may be performed so that a pre-modulation signal corresponding to a random number and pre-demodulation signals corresponding to the pre-modulation signal are applied in the same packet, and thus, noise processing may be performed on a received signal which is delayed by a certain range or more. In an example embodiment, the predetermined value may denote 2 pi, but is not limited thereto. According to an example embodiment, the predetermined value may denote an unambiguous range which is capable of being measured without separate manipulation in the image sensor 14'.

Referring to FIG. 12C, a second time gating method for measuring a second object 220 disposed in a second unambiguous range is illustrated. Referring to FIG. 12C, in a first period, a pre-modulation signal and a pre-demodulation signal corresponding thereto may be applied to be staggered once. According to an example embodiment, in the first period, the pre-modulation signal may be applied as a signal corresponding to a random number 1, and the pre-demodulation signal may be applied as a signal corresponding to a random number 0. In a second period, a pre-modulation signal may be applied as a signal corresponding to a random number 2, and a pre-demodulation signal may be applied as a signal corresponding to a random number 1. In a third period, a pre-modulation signal may be applied as a signal corresponding to a random number 3, and a pre-demodulation signal may be applied as a signal corresponding to a random number 2.

As described above, a pre-modulation signal and a pre-demodulation signal may be arranged to be staggered at every one period for each packet, and thus, the second object 220 disposed in the second unambiguous range corresponding to a range of about 2 pi to about 4 pi may be detected.

Referring to FIG. 12D, a third time gating method for measuring a third object 230 disposed in a third unambiguous range is illustrated. Referring to FIG. 12D, in a first period, a pre-modulation signal and a pre-demodulation signal corresponding thereto may be applied to be staggered twice.

Referring to FIG. 12D, in the first period, the pre-modulation signal and the pre-demodulation signal corresponding thereto may be applied to be staggered. According to an example embodiment, in the first period, the pre-modulation signal may be applied as a signal corresponding to a random number 1, and the pre-demodulation signal may be applied as a signal corresponding to a random number 0-1. In a second period, a pre-modulation signal may be applied as a signal corresponding to a random number 2, and a pre-demodulation signal may be applied as a signal corresponding to a random number 0. In a third period, a pre-modulation signal may be applied as a signal corresponding to a random number 3, and a pre-demodulation signal may be applied as a signal corresponding to a random number 1.

As described above, a pre-modulation signal and a pre-demodulation signal may be arranged to be staggered at every two periods for each packet, and thus, the third object 230 disposed in the third unambiguous range corresponding to a range of about 4 pi to about 6 pi may be detected.

That is, in FIGS. 12C to 12D, when an unambiguous range is greater than a predetermined value (for example, about 2 pi), control may be performed so that a pre-modulation signal corresponding to a random number and pre-demodulation signals corresponding to the pre-modulation signal are applied in different packets, so as to measure an object, and thus, a desired range region may be set.

In an example embodiment, only the first object 210 in the first unambiguous range, the second object 220 in the second unambiguous range, and the third object 230 in the third unambiguous range are illustrated, but example embodiments are may be expanded and applied to an object disposed at a position outside the third unambiguous range.

Figure 13A:
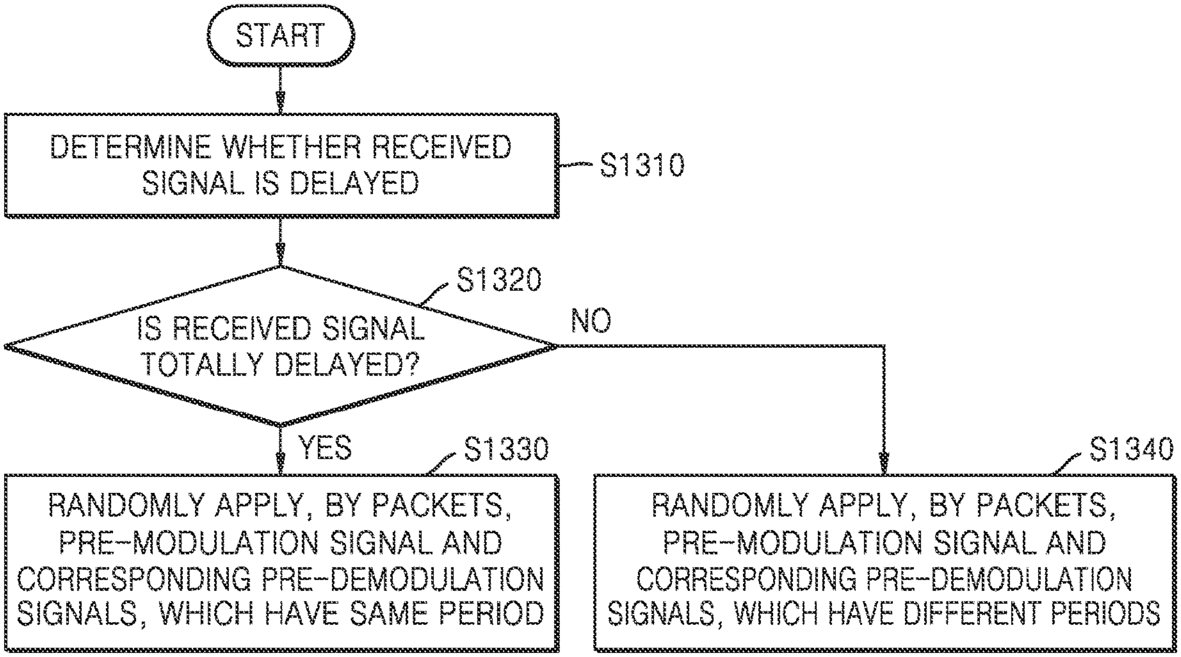
FIGS. 13A and 13B are flowcharts for describing an operating method of an image sensor, according to an example embodiment.
Figure 13B:
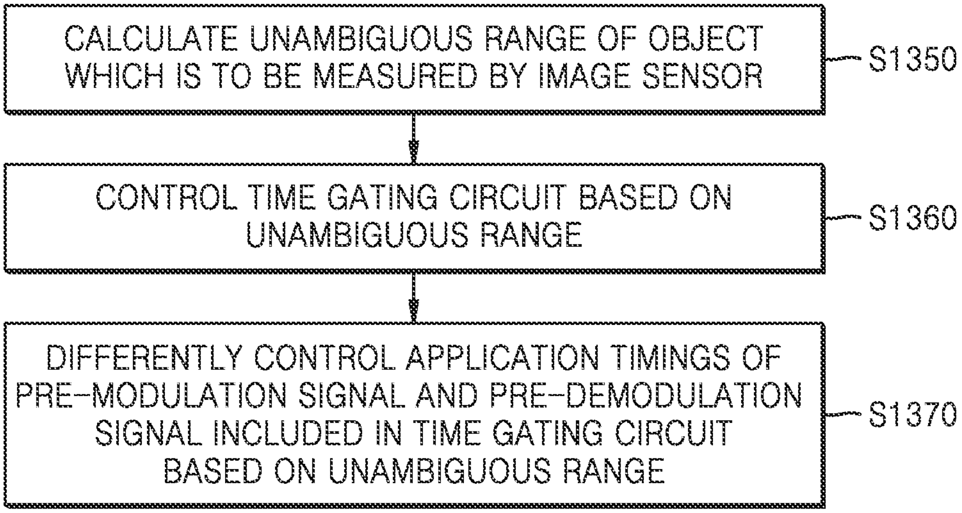

FIGS. 13A and 13B are flowcharts for describing an operating method of an image sensor, according to an example embodiment.

According to an example embodiment, an integration time may be a time of exposing a pixel at the outside to store light information, and a readout time may be a time for reading stored information. The operating method of the image sensor according to an example embodiment may be applied to the integration time and may perform control so that a phase of a modulation signal and a phase of a demodulation signal are randomly changed during the integration time at every certain period. To this end, a modulation signal and demodulation signals may be changed in phase, based on a predefined random number. A packet may be changed at an interval of one period, or may have different packet periods for each phase, based on performance improvement or an operation mode. In a case where such an operation is performed, wrapped reception signals may be substituted into a random noise component, and a signal may not be affected in calculating a depth.

Referring to FIG. 13A, in operation S1310, whether a received signal is delayed may be determined. According to an example embodiment, whether the received signal is delayed by 2 pi or more may be determined. According to an example embodiment, whether the received signal is delayed by a period or more of a modulation signal may be determined.

In operation S1320, whether the received signal is totally delayed may be determined. According to an example embodiment, that the received signal is totally delayed may correspond to the reception signal of FIG. 6. According to an example embodiment, that the received signal is not totally delayed may denote that only a portion of the received signal is delayed. According to an example embodiment, that the received signal is not totally delayed may correspond to the reception signal of FIG. 8.

In operation S1330, when the received signal is totally delayed, control may be performed so that a pre-modulation signal and corresponding pre-demodulation signals having the same period are randomly applied by packets.

In operation S1340, when the received signal is not totally delayed, control may be performed so that a pre-modulation signal and corresponding pre-demodulation signals having different periods are randomly applied by packets.

That is, in operation S1330 and operation S1340, control may be performed so that a pre-modulation signal and a plurality of pre-demodulation signals corresponding thereto, which have different phases, are applied based on a random number in each packet to which a delayed signal is applied.

Referring to FIG. 13B, in operation S1350, an unambiguous range of an object to be measured by an image sensor may be calculated. According to an example embodiment, whether the unambiguous range of the object to be measured is arranged within a predetermined value may be calculated. The predetermined value may be calculated with respect to 2 pi.

In operation S1360, a time gating circuit may be controlled based on the unambiguous range. According to an example embodiment, when the unambiguous range is less than 2 pi, the time gating circuit may perform random noise processing on a signal which is delayed by 2 pi or more, and thus, only signals corresponding to a signal which is within 2 pi may be measured. When the unambiguous range is greater than or equal to 2 pi, the time gating circuit may perform control so that a period of a pre-modulation signal and a period of a pre-demodulation signal are staggered with each other.

In operation S1370, application timings of the pre-modulation signal and the pre-demodulation signal each included in the time gating circuit may be differently controlled based on the unambiguous range. According to an example embodiment, when the unambiguous range is greater than or equal to 2 pi, control may be performed so that the application timings of the pre-modulation signal and the pre-demodulation signal are staggered during at least one period, and thus, depth information about an object disposed at a desired position may be determined.

Example embodiments may be applied to an image sensor using a multi-frequency. Example embodiments may be applied to only one frequency, associated with range measurement, of a multi-frequency, or may be applied to all of two frequencies. In a case where two or more frequencies are used, an actual measured unambiguous range may be the same as a frequency value corresponding to a greatest common divisor of two frequencies. For example, in a case which uses a frequency of about 100 MHz to about 20 MHz, a method may be implemented where five demodulation clocks are provided per one packet in 100 MHz and one demodulation clock is provided per one packet in 20 MHz. In this case, when at least one frequency component of two frequency components is random, a wrapping signal may be substituted into random noise. According to an example embodiment, five demodulation clocks may be provided per one packet in only 100 MHz, and one demodulation clock may be provided per one packet in 20 MHz.

Hereinabove, example embodiments have been described in the drawings and the specification. Example embodiments have been described by using the terms described herein, but this has been merely used for describing the inventive concept and has not been used for limiting a meaning or limiting the scope of the inventive concept defined in the following claims. Therefore, it may be understood by those of ordinary skill in the art that various modifications and other equivalent example embodiments may be implemented from the inventive concept. Accordingly, the spirit and scope of the inventive concept may be defined based on the spirit and scope of the following claims.

While aspects of example embodiments have been particularly shown and described, it will be understood that various changes in form and details may be made therein without departing from the spirit and scope of the following claims.

What is claimed is:

1. An image sensor for measuring a depth of an object disposed in an unambiguous range, the image sensor comprising:

a modulation clock generating circuit configured to generate first to Nth modulation clock signals respectively having N phases;

a demodulation clock generating circuit configured to generate first to Nth demodulation clock signals respectively having N phases respectively corresponding to the first to Nth modulation clock signals;

a phase selection circuit configured to select one modulation clock signal from among the first to Nth modulation clock signals to output as a pre-modulation signal, based on a random number, and select, from among the first to Nth demodulation clock signals, and output as first to Nth pre-demodulation signals corresponding to the pre-modulation signal, based on the random number; and a time gating circuit configured to control a time at which the pre-modulation signal and the first to Nth pre-demodulation signals are applied, based on the unambiguous range, wherein N is a natural number of 2 or more.

2. The image sensor of claim 1, further comprising a random number generating circuit configured to generate the random number for each of a plurality of packets, and apply the random number to the phase selection circuit, by units of a packet, wherein each of the plurality of packets corresponds to a period of each of the first to Nth modulation clock signals.

3. The image sensor of claim 2, wherein the random number generating circuit is further configured to generate the random number from among N numbers.

4. The image sensor of claim 1, wherein a phase difference between each of the first to Nth modulation clock signals corresponds to a phase difference between each of the first to Nth demodulation clock signals.

5. The image sensor of claim 2, wherein each of the first to Nth modulation clock signals has a common period.

6. The image sensor of claim 2, wherein each of the first to Nth modulation clock signals has a different period.

7. The image sensor of claim 6, wherein a duty ratio of each of the first to Nth modulation clock signals corresponds to a duty ratio of each of the first to Nth demodulation clock signals.

8. The image sensor of claim 6, wherein each of the first to Nth demodulation clock signals that has a phase offset from a modulation clock signal maintains a signal level as a first level or a second level before a time at which a phase of the modulation clock signal is shifted from the first level to the second level.

9. The image sensor of claim 7, wherein each of the first to Nth demodulation clock signals that has a phase offset from a modulation clock signal maintains a signal level as a first level or a second level before a time at which a phase of the modulation clock signal is shifted from the first level to the second level.

10. The image sensor of claim 1, wherein the time gating circuit is configured to, based on the unambiguous range being within a predetermined value, apply the pre-modulation signal and the first to Nth pre-demodulation signal in a common packet.

11. The image sensor of claim 1, wherein the time gating circuit is further configured to, based on the unambiguous range being greater than a predetermined value, apply the pre-modulation signal and the first to Nth pre-demodulation signal in different packets.

12. The image sensor of claim 1, wherein the phase selection circuit is further configured to operate based on a signal received from the object being delayed by a predetermined value or more.

13. An operating method of an image sensor which transmits a light signal, transferred by using a light source driven by a modulation signal, to an object and performs an arithmetic operation on a signal reflected and received from the object to measure a depth of the object, the operating method comprising:

determining whether the signal is delayed by a period or more of the modulation signal; and based on the signal being delayed by the period or more of the modulation signal, performing control so that a pre-modulation signal and a plurality of pre-demodulation signals corresponding to the pre-modulation signal, which respectively have different phases, are applied based on a random number in each packet to which the signal that is delayed by the period or more is applied.

14. The operating method of claim 13, wherein the determining comprises determining whether the signal is a totally delayed signal or a partially delayed signal.

15. The operating method of claim 14, wherein, based on the signal being the totally delayed signal, performing control so that the plurality of pre-demodulation signals have different phases and a common period.

16. The operating method of claim 14, wherein, based on the signal being the partially delayed signal, performing control so that the plurality of pre-demodulation signals have different phases and different periods.

17. The operating method of claim 13, further comprising:

determining whether a range between the object and the image sensor is within an unambiguous range; and controlling an application time of each of the pre-modulation signal and the plurality of pre-demodulation signals, based on a value of the unambiguous range.

18. The operating method of claim 17, further comprising, based on the unambiguous range being within a predetermined value, performing control to apply the pre-modulation signal and the plurality of pre-demodulation signals in a common packet.

19. The operating method of claim 17, further comprising, based on the unambiguous range being greater than a predetermined value, performing control to apply the pre-modulation signal and the plurality of pre-demodulation signals in different packets.

20. A camera module comprising:

a light source configured to emit a transmission light signal to an object; and an image sensor configured to receive a reception light signal reflected from the object to measure a depth of the object disposed in an unambiguous range, wherein the image sensor comprises:

a modulation clock generating circuit configured to generate first to Nth modulation clock signals respectively having N phases;

a demodulation clock generating circuit configured to generate first to Nth demodulation clock signals respectively having N phases respectively corresponding to the first to Nth modulation clock signals;

a phase selection circuit configured to select one modulation clock signal from among the first to Nth modulation clock signals to output as a pre-modulation signal, based on a random number, and select, from among the first to Nth demodulation clock signals, and output first to Nth pre-demodulation signals corresponding to the pre-modulation signal, based on the random number; and a time gating circuit configured to control a time at which the pre-modulation signal and the first to Nth pre-demodulation signals are applied, based on the unambiguous range, wherein N is a natural number of 2 or more.

* * * * *